United States Patent
Yong et al.

(10) Patent No.: US 9,949,063 B2
(45) Date of Patent: Apr. 17, 2018

(54) BLUETOOTH LOW ENERGY TRIGGERING NAN FOR FURTHER DISCOVERY AND CONNECTION

(71) Applicant: Apple Inc., Cupertino, CA (US)

(72) Inventors: Su Khiong Yong, Palo Alto, CA (US); Yong Liu, Campbell, CA (US); Christiaan A. Hartman, San Jose, CA (US); Siegfried Lehmann, Sunnyvale, CA (US); Guoqing Li, Cupertino, CA (US); Chiu Ngok E. Wong, San Jose, CA (US)

(73) Assignee: Apple Inc., Cupertino, CA (US)

( * ) Notice: Subject to any disclaimer, the term of this patent is extended or adjusted under 35 U.S.C. 154(b) by 17 days.

(21) Appl. No.: 15/167,096

(22) Filed: May 27, 2016

(65) Prior Publication Data

US 2016/0353233 A1 Dec. 1, 2016

Related U.S. Application Data

(60) Provisional application No. 62/169,536, filed on Jun. 1, 2015.

(51) Int. Cl.
*H04W 4/00* (2009.01)
*H04L 29/08* (2006.01)
(Continued)

(52) U.S. Cl.
CPC ............ *H04W 4/008* (2013.01); *H04L 67/16* (2013.01); *H04W 48/16* (2013.01); *H04W 76/02* (2013.01); *H04W 8/005* (2013.01); *H04W 88/06* (2013.01)

(58) Field of Classification Search
CPC ...... H04L 67/16; H04W 48/16; H04W 4/008; H04W 76/02; H04W 88/06; H04W 8/005
See application file for complete search history.

(56) References Cited

U.S. PATENT DOCUMENTS 5,950,133 A 9/1999 Bledsoe
6,778,825 B2 8/2004 Parkman
(Continued)

FOREIGN PATENT DOCUMENTS

WO 2005034551 4/2005

OTHER PUBLICATIONS

Extended European Search Report for European Patent Application No. 16172214.5, Nov. 2, 2016, pp. 1-11.
(Continued)

*Primary Examiner* — Lewis West
(74) *Attorney, Agent, or Firm* — Meyertons Hood Kivlin Kowert & Goetzel, P.C.; Jeffrey C. Hood; Brian E. Moore

(57) ABSTRACT

In some embodiments, one or more wireless stations operate according to Neighbor Awareness Networking (NAN)—direct communication with neighboring wireless stations, e.g., direct communication between the wireless stations without utilizing an intermediate access point. Embodiments of the disclosure relate to triggering a NAN datapath using Bluetooth low energy (BLE) signaling. The NAN datapath embodiments described herein provide a mechanism through which devices can communicate to establish a Wi-Fi connection via non-Wi-Fi signaling and provide services. Aspects of the datapath development include Wi-Fi connection establishment and datapath initiation. The datapath model may be implemented for unicast and/or multicast communication between wireless stations, including mobile stations.

20 Claims, 23 Drawing Sheets

(51) Int. Cl.
*H04W 76/02* (2009.01)
*H04W 48/16* (2009.01)
*H04W 8/00* (2009.01)
*H04W 88/06* (2009.01)

(56) References Cited

U.S. PATENT DOCUMENTS

| | | |
|---|---|---|
| 9,380,119 B2 | 6/2016 | Kasslin et al. |
| 2002/0012320 A1 | 1/2002 | Ogler et al. |
| 2002/0168971 A1 | 11/2002 | Parkman |
| 2003/0072270 A1 | 4/2003 | Guerin et al. |
| 2003/0161330 A1 | 8/2003 | Umeda |
| 2004/0018839 A1 | 1/2004 | Andric et al. |
| 2004/0170154 A1 | 9/2004 | Carter et al. |
| 2005/0047364 A1 | 3/2005 | Matsukura et al. |
| 2005/0135329 A1 | 6/2005 | Lee et al. |
| 2005/0201269 A1 | 9/2005 | Shim et al. |
| 2005/0232183 A1 | 10/2005 | Sartori et al. |
| 2005/0265360 A1 | 12/2005 | Kim et al. |
| 2005/0272481 A1 | 12/2005 | Kim |
| 2005/0286451 A1 | 12/2005 | Kim et al. |
| 2014/0082205 A1* | 3/2014 | Abraham ............ H04L 65/1069 709/227 |
| 2014/0378058 A1* | 12/2014 | Decuir .................. H04W 4/008 455/41.2 |
| 2015/0319695 A1* | 11/2015 | Huang .................. H04W 4/008 370/311 |
| 2015/0365876 A1 | 12/2015 | Wang et al. |
| 2015/0382301 A1* | 12/2015 | Huang .............. H04W 52/0229 370/311 |
| 2016/0014712 A1* | 1/2016 | Belleschi .............. H04W 8/005 455/434 |
| 2016/0021526 A1* | 1/2016 | Niu ................... H04W 72/0413 370/230 |
| 2016/0050551 A1 | 2/2016 | Qi et al. |
| 2016/0127996 A1 | 5/2016 | Patil et al. |
| 2016/0192273 A1* | 6/2016 | Oren ................... H04W 40/244 370/329 |

OTHER PUBLICATIONS

Andrew Donoho, "UPnP Device Architecture 2.0", Retrieved from the Internet: URL:http://upnp.org/specs/arch/UPnP-arch-DeviceArchitecture-v2.0.pdf [retrieved on Oct. 18, 2016], Feb. 20, 2015, pp. 1-196.

Hangki Joh et al., "A hybrid Wi-Fi P2P with bluetooth low energy for optimizing smart device's communication prop", Peer-to-Peer Networking and Applications, Springer, US, vol. 8, No. 4, Apr. 25, 2014, pp. 1-11.

Johnson D. et al., "The Dynamic Source Routing Protocol for Mobile Ad Hoc Networks (DSR)", IETF MANET Working Group Internet-Draft, 1-114, Jul. 19, 2004, (hllp:l/www.ielf.org/internet-drafts/draft-ielf-manet-dsr-10.1xt).

* cited by examiner

| AD Length | SSD AD Type | Add Carriers | Org. ID | SDS Flag | Length | Org. Data |
|---|---|---|---|---|---|---|
| (1 byte) | (1 byte) | | (1 byte) | (1 byte) | (1 byte) | (0-25 bytes) |

FIG. 4A

| AD Length | TDD AD Type | Org. ID | TDS Flags | Transport Data Length | Transport Data |
|---|---|---|---|---|---|
| (1 byte) | (1 byte) | (1 byte) | (1 byte) | (1 byte) | (0-26 bytes) |

FIG. 4B

| Band Support | Infrastructure Flag | P2P Flag | NAN Flag | Bloom Filter Bit Arrage | Transport Information |
|---|---|---|---|---|---|
| (B0-B1) | (B2-B4) | (B5-B7) | (B8-B10) | (53 bits) | |

FIG. 4C

BLUETOOTH LOW ENERGY TRIGGERING NAN FOR FURTHER DISCOVERY AND CONNECTION

PRIORITY DATA

This application claims the benefit of priority to U.S. Provisional Application Ser. No. 62/169,536, titled "Bluetooth Low Energy Triggering NAN for Further Discovery and Connection", filed Jun. 1, 2015, by Su Khiong Yong, Yong Liu, Christiaan A. Hartman, Siegfried Lehmann, Guoqing Li, and Chiu Ngok E. Wong, which is hereby incorporated by reference in its entirety as though fully and completely set forth herein.

FIELD

The present application relates to wireless communications, including techniques for wireless communication among mobile stations in a wireless networking system.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "user devices" or STA or UE for short. Wireless stations can be either wireless access points or wireless clients (or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

In some prior art systems Wi-Fi mobile stations are able to communicate directly with each other without using an intermediate access point. However, improvements in the operation of such devices are desired, such as in setup and coordination of the communication between such devices.

SUMMARY

Embodiments described herein relate to using a lower power wireless interface to trigger establishment of a datapath over a higher power wireless interface.

Embodiments relate to a wireless station that includes one or more antennas, one or more radios, and one or more processors coupled (directly or indirectly) to the radios. At least one radio is configured to communicate using Wi-Fi and either or both of Bluetooth and Bluetooth low energy. The wireless station may perform voice and/or data communications, as well as the methods described herein.

In some embodiments, one or more wireless stations operate according to Neighbor Awareness Networking (NAN)—direct communication with neighboring wireless stations, e.g., direct communication between the wireless stations without utilizing an intermediate access point. Some embodiments of the disclosure relate to triggering a NAN datapath (or further service discovery for a possible NAN datapath) using relatively low power signaling such as Bluetooth low energy (BLE) signaling. The NAN datapath embodiments described herein provide a mechanism through which devices can communicate to establish a relatively high power connection, such as a Wi-Fi connection, via a relatively low power connection, such as non-Wi-Fi signaling (e.g., Bluetooth, BLE, ZigBee, and so forth), and provide/receive services. Aspects of the datapath development include Wi-Fi connection establishment and datapath initiation. The datapath model may be implemented for unicast and/or multicast communication between wireless stations, including mobile stations.

This Summary is intended to provide a brief overview of some of the subject matter described in this document. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIG. 4A illustrates an example ADV packet format with SDD AD type, according to some embodiments.

FIG. 4B illustrates an example ADV packet format with TDD AD type, according to some embodiments.

FIG. 4C illustrates an example frame format for transport data field of an ADV packet, according to some embodiments.

Figure 1:
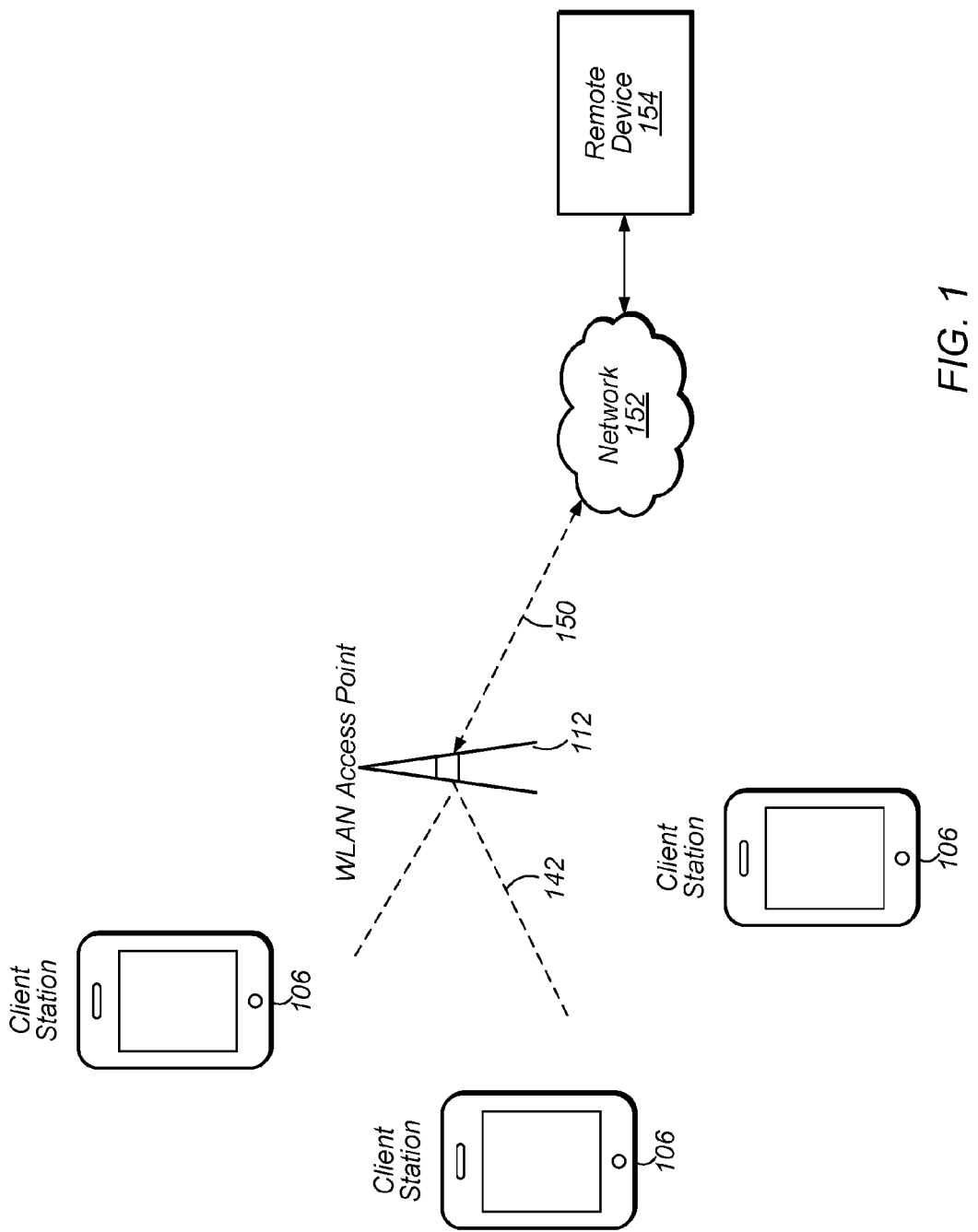
FIG. 1 illustrates an example WLAN communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

UE: User Equipment
AP: Access Point
DL: Downlink (from BS to UE)
UL: Uplink (from UE to BS)
TX: Transmission/Transmit
RX: Reception/Receive
LAN: Local Area Network
WLAN: Wireless LAN
RAT: Radio Access Technology
DW: Discovery Window
NW: Negotiation Window
FAW: Further Availability Window
SID: Service ID
SInf: Service Information
Sinf-Seg: Service Information Segment
NW-Req: to request the peer NAN device to present in NW
CaOp: Capabilities and Operations elements
Security: Security preferences
SessionInfo: advertisement_id, session_mac, session_id, port, proto
ChList: preferred datapath channels

TERMINOLOGY

The following is a glossary of terms used in this disclosure:

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™ Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™ Play Station Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

NAN data link (NDL)—refers to a communication link between peer wireless stations (e.g., peer NAN devices). Note that the peer devices may be in a common (e.g., same) NAN cluster. In addition, a NAN data link may support one or more NAN datapaths between peer wireless stations. Note further that a NAN data link may only belong to a single NAN data cluster.

NAN datapath (NDP)—refers to a communication link between peer wireless stations that supports a service. Note that one or more NAN datapaths may be supported by a NAN data link. Additionally, note that a NAN datapath supports a service between wireless stations. Typically, one of the peer wireless stations will be a publisher of the service and the other peer wireless station will be a subscriber to the service.

NAN cluster—refers to multiple peer wireless stations linked via synchronization to a common time source (e.g., a common NAN clock). Note that a peer wireless station may be a member of more than one NAN cluster.

NAN data cluster (NDC)—refers to a set of peer wireless stations in a common (e.g., same) NAN cluster that share a common base schedule (e.g., a NAN data cluster base schedule). In addition, peer wireless stations in a NAN data cluster may share at least one NAN data link that includes an active datapath with another member wireless station within the NAN data cluster.

Note that a peer wireless station may be a member of more than one NAN cluster; however, as noted previously, a NAN data link belongs to exactly one NAN data cluster. Note further, that in a NAN data cluster, all member peer wireless stations may maintain tight synchronization (e.g., via a NAN data cluster base schedule) amongst each other and may be present at a common (e.g., same) further availability slot(s) (or window(s)) as indicated by a NAN data cluster base schedule. In addition, each NAN data link may have its own NAN data link schedule and the NAN data link schedule may be a superset of a NAN data cluster base schedule.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. §112(f) interpretation for that component.

FIG. 1—WLAN System

FIG. 1 illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one wireless device 106 is configured to communicate directly with one or more neighboring mobile devices, without use of the access point 112.

In some embodiments, as further described below, a wireless device 106 may be configured to perform methods for establishing a NAN datapath using, e.g., Bluetooth low energy (BLE) signaling. For example, wireless device 106 may communicate with a neighboring wireless device (e.g., another wireless device 106 and or access point 112) to establish a Wi-Fi connection via non-Wi-Fi signaling (e.g., BLE signaling or another lower power signaling) and then provide or receive services via the Wi-Fi connection.

Figure 2:
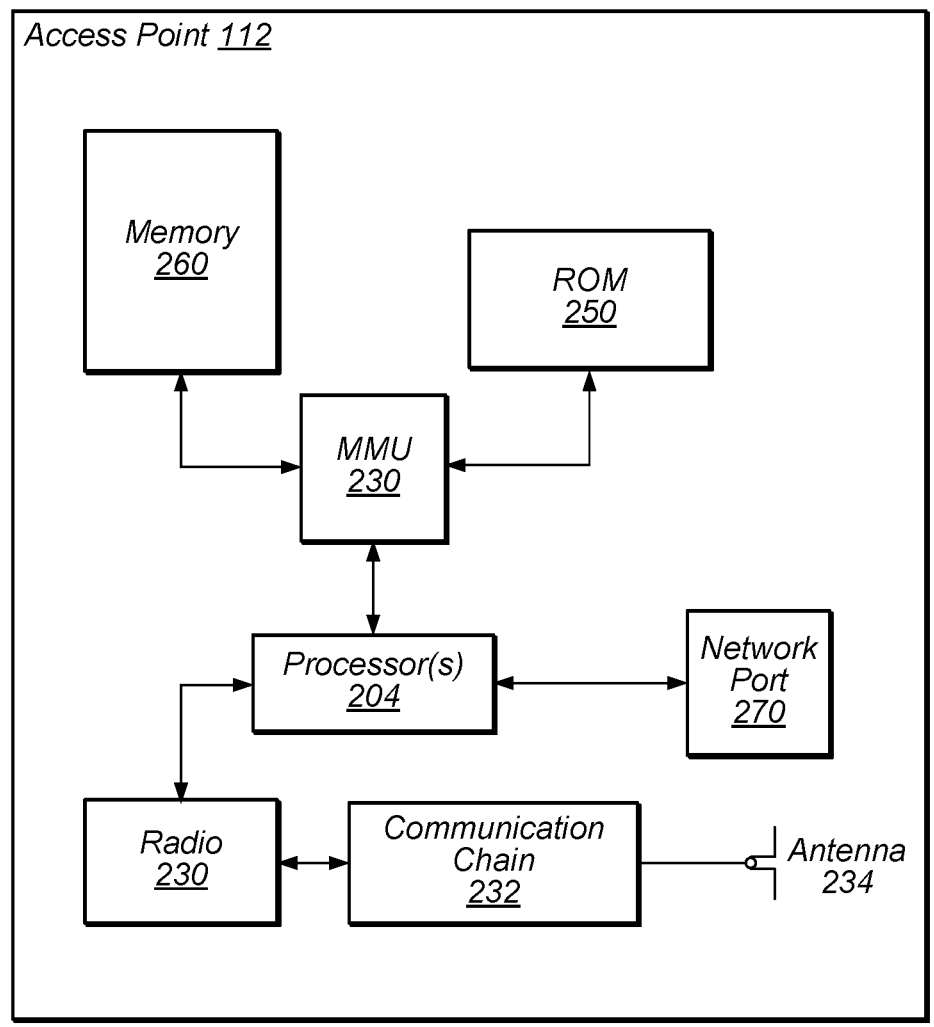
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, AP 112 may be configured to perform methods for a establishing a NAN datapath using, e.g., Bluetooth low energy (BLE) signaling. For example, AP 112 may communicate with a neighboring wireless device (e.g., a wireless device 106) to establish a Wi-Fi connection via non-Wi-Fi signaling (e.g., BLE signaling or another lower power signaling such as Bluetooth or ZigBee) and provide services via the Wi-Fi connection.

Figure 3:
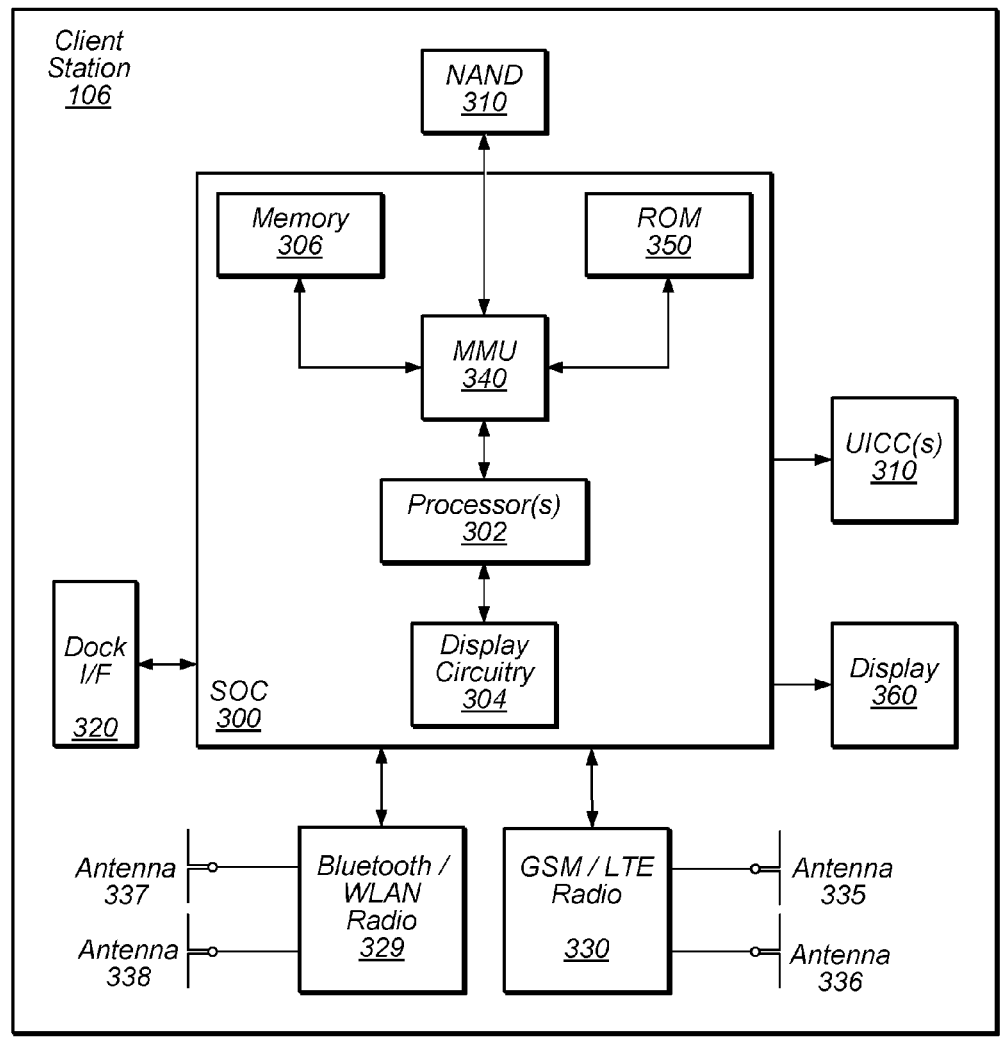
FIG. 3 illustrates an example simplified block diagram of a mobile station (UE), according to some embodiments.

FIG. 3—Client Station Block Diagram

FIG. 3 illustrates an example simplified block diagram of a client station 106. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F)

(or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the client station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1. Further, in some embodiments, as further described below, client station 106 may be configured to perform methods for establishing a NAN datapath using signaling over a lower power interface such as a Bluetooth low energy (BLE) interface. For example, client station 106 may communicate with a neighboring wireless device (e.g., another client station 106 and or access point 112) to establish a Wi-Fi connection via non-Wi-Fi signaling (e.g., BLE signaling or another lower power signaling such as Bluetooth or ZigBee) and provide services via the Wi-Fi connection.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short range wireless communication circuitry 329 may each include one or more processing elements. In other words, one or more processing elements may be included in cellular communication circuitry 330 and also in short range wireless communication circuitry 329. Thus, each of cellular communication circuitry 330 and short range wireless communication circuitry 329 may include one or more integrated circuits (ICs) that are configured to perform the functions of cellular communication circuitry 330 and short range wireless communication circuitry 329, respectively. In addition, each integrated circuit may include circuitry (e.g., first circuitry, second circuitry, etc.) configured to perform the functions of cellular communication circuitry 330 and short range wireless communication circuitry 329.

Wi-Fi Peer to Peer Communication Protocol

In some embodiments, Wi-Fi devices (e.g., client station 106) may be able to communicate with each other in a peer to peer manner, e.g., without the communications going through an intervening access point. There are currently two types of Wi-Fi peer to peer networking protocols in the Wi-Fi Alliance. In one type of peer to peer protocol, when two Wi-Fi devices (e.g., wireless stations) communicate with each other, one of the Wi-Fi devices essentially acts as a pseudo access point and the other acts as a client device. In a second type of Wi-Fi peer to peer protocol, referred to as a neighbor awareness networking (NAN), the two Wi-Fi client devices (wireless stations) act as similar peer devices in communicating with each other, e.g., neither one behaves as an access point.

In a NAN system, each wireless station may implement methods to ensure that it is synchronized with a neighboring wireless station to which it is communicating. Further, a wireless station may negotiate a common discovery window for exchange of synchronization packets to help ensure the devices that are communicating directly with each other are properly synchronized to enable the communication. Once two wireless stations have the same discovery window they may exchange synchronization packets to stay synchronized with each other. The wireless stations may also use the discovery window to exchange service discovery frames to convey other information such as further availability beyond discovery windows.

The NAN protocol includes two aspects: 1) synchronization and discovery (NAN 1.0) and 2) datapath transmission (NAN 2.0). NAN 1.0 describes methods for NAN protocol synchronization and discovery. After two wireless stations have discovered each other (per NAN 1.0) they may implement a procedure to setup a NAN datapath between them so that they can properly communicate. After this, the two wireless stations arrange for a common datapath negotiation window so that they can negotiate capabilities, synchronization requirements, and exchange further service information. The datapath negotiation window is a time window that enables two wireless stations to communicate with each other so that they can negotiate these capabilities and synchronization requirements and exchange this further service information. Once the datapath negotiation window has been established and NAN datapath setup has been performed, the wireless stations may perform datapath synchronization to help ensure that the two stations stay synchronized with each other for proper communication. Finally, datapath resource allocation relates to two peer wireless stations communicating with each other regarding a common time slot and channel for communication. In other words, the two devices communicate with each other regarding which channel they should use and at which time slot, to help ensure proper communication between them. Additionally, the two devices communicate with each other regarding which channel and time slot each would prefer to use for future communications between the devices.

Embodiments described herein further define methods for triggering initiation of a NAN datapath via a relatively low power connection (e.g., Bluetooth low energy (BTLE or BLE), Bluetooth (BT), or ZigBee, among relatively low power connections. The trigger may initiate further service discovery and subsequently datapath over a relatively high power connection (e.g., Wi-Fi) and/or a datapath directly over the relatively higher power connection.

Bluetooth Low Energy Discovery

In some embodiments, discovery of things (DoT) may use an advertising packet (ADV) with advertising (AD) type service discovery data (SDD) for service discovery over Bluetooth low energy (BLE). The ADV may be constrained to a maximum of 25 bytes of data for service related information. The provider (e.g., publisher and/or advertiser) may send an ADV to advertise its supported services. Note that in some embodiments, e.g., unsolicited publish, sending an ADV may be mandatory. The seeker (e.g., subscriber and/or scanner) may scan for devices that include SDD AD type in the ADV to discover providers that may have compatible services. Note that in some embodiments, e.g., passive subscribe, scanning may be mandatory. Additionally, the seeker may send a connection request message, e.g., CONNECT request message, to setup a low energy (LE) connection with the provider. Then, further service information may be exchanged between seeker and provider via a generic attribute profile (GATT) database before deciding to turn on an alternate transport (e.g., Wi-Fi). Note that embodiments may use an ADV packet format with SDD AD type as illustrated in FIG. 4A or an ADV packet format with TDD AD type as illustrated in FIG. 4B.

In some embodiments, as FIG. 4A illustrates, the ADV packet may include 1 byte for AD length, 1 byte for service discovery data AD type code (SSD AD type), 1 byte for origin identification (org. ID), 1 byte for SDS flag, 1 byte for length, and up to 25 bytes for origin data. In addition, the ADV packet may also include information related to additional carriers, such as an indication if there is information about additional carriers in a GATT database that is not represented in the DVP packet. The SDS flag field may include bits for indicating seeker/provider status (e.g., bit 0), indicating scanning enablement/disablement (e.g., bit 1), indicating additional data in GATT (e.g., bit 2), indicating an alternate transport state (ON/OFF) (e.g., bit 3), indicating an availability of an alternate transport for connection (e.g., bit 3), and indicating whether an alternative transport connection is available/unavailable (e.g., bit 4). Note that Wi-Fi as an alternate transport may have several interfaces (e.g., NAN, Wi-Fi Direct, and Infrastructure) which may or may not be ON and Wi-Fi as an alternate transport may have several interfaces (e.g., NAN, Wi-Fi Direct, and Infrastructure) which may or may not be available for connection.

In some embodiments, as FIG. 4B illustrates, the ADV packet may include 1 byte for AD length, 1 byte for transport discovery data AD type code (TDD AD type), 1 byte for origin identification (org. ID), 1 byte for TDS flag, 1 byte for transport data length, and up to 26 bytes for transport data. In addition, the ADV packet may also include information related to additional carriers, such as an indication if there is information about additional carriers in a GATT database that is not represented in the DVP packet. The TDS flag field may include bits for indicating seeker/provider status (e.g., bit 0), indicating scanning enablement/disablement (e.g., bit 1), indicating additional data in GATT (e.g., bit 2), indicating an alternate transport state (ON/OFF) (e.g., bit 3), indicating an availability of an alternate transport for connection (e.g., bit 3), and indicating whether an alternative transport connection is available/unavailable (e.g., bit 4). Note that Wi-Fi as an alternate transport may have several interfaces (e.g., NAN, Wi-Fi Direct, and Infrastructure) which may or may not be ON and Wi-Fi as an alternate transport may have several interfaces (e.g., NAN, Wi-Fi Direct, and Infrastructure) which may or may not be available for connection.

In some embodiments, as FIG. 4C illustrates, a transport data field of an ADV packet may include bytes for band support, infrastructure flag, P2P flag, NAN flag, and transport specific information. In addition, bits may be reserved for a Bloom filter bit array. In some embodiments, the band support field may include a first bit (B0) to indicate whether 2.4 GHz band supported or if 2.4 GHz and 5 GHz bands are supported and a second bit (B1) to indicate support for 60 GHz band. The infrastructure flag field may include a first bit (B2) to indicate whether infrastructure communication is supported, a second bit (B3) to indicate an infrastructure channel, and a third bit (B3) to indicate infrastructure information present. The P2P flag field may include a first bit (B5) to indicate whether peer-to-peer (P2P) communication is supported, a second bit (B6) to indicate a P2P channel, and a third bit (B7) to indicate P2P information present. The NAN flag field may include a first bit (B8) to indicate whether NAN communication is supported, a second bit (B9) to indicate a NAN channel, and a third bit (B10) to indicate information present. The Bloom filter bit array may be 53 bits.

In some embodiments, the DoT framework supports forward advertisement (e.g., provider to seeker) but may or may not support reverse advertisement (e.g., seeker to provider). In some embodiments, reverse advertisement may not be as reliable as forward advertisement for setting up BLE connection and then querying GATT database as described above. In some embodiments, reverse advertisement may require scanning at the advertiser side which may result in additional power usage as compared to forward advertisement.

In some embodiments, a reverse advertisement may be used as a response to the ADV packet sent by the advertiser. Note that the response may be made unicast rather than broadcast by adding an address of intended recipients which may also provide filtering at the receiver side. In addition, the reverse advertisement may be used as a broadcast frame for a seeker to seek for specific service(s) in order to support active subscribe use cases. Further, the reverse advertisement may be used to turn ON an alternate transport (without requiring BLE connection) of the peer devices to perform further discovery which may be accomplished by pre-association and at Wi-Fi rate. In addition, a user may be able to select a device from a list of discovered devices. Reverse advertisement may also reduce discovery time and provide better user experience in the presence of multiple peer devices.

Table 1 summarizes various use cases for reverse advertisement, according to some embodiments. Note that BLE is used as an exemplary communication protocol in disclosed embodiments. However, another relatively lower power communication protocol can be used in place of BLE, such as Bluetooth or ZigBee.

As shown, there may be at least eight use cases for reverse advertisement, according to some embodiments. For example, a first case (case 1) may include publisher (e.g., a wireless device such as client station 106) performing an unsolicited publish of a service. In other words, the publisher may actively send (e.g., transmit or broadcast) an ADV packet. In addition, the publisher may be performing BLE passive scanning (e.g., listening or receiving ADV packets and not requesting additional information regarding the advertisement). Further, the first case may include a subscriber (e.g., a wireless device such as client station 106) performing a passive subscribe while additionally performing BLE passive scanning. In other words, the subscriber may only send an ADV packet where there is a service matched with the publisher.

Further, in a sixth case (case 6), which may be considered a reverse of the second case, a subscriber may be performing an active subscribe to a service while performing BLE active scanning and a publisher may be performing a solicited publish of the service while performing BLE passive scanning.

In a seventh case (case 7), which may be considered a reverse of the third case, a subscriber may be performing an active subscribe to a service while performing BLE passive scanning and a publisher may be performing a solicited publish of the service while performing BLE active scanning. In an eighth case (case 8), which may be considered a reverse of the fourth case, a subscriber may be performing an active subscribe to a service while performing BLE active scanning and a publisher may be performing a solicited publish of the service while performing BLE active scanning.

Note that in some embodiments, the sixth case may be considered a special case of the fifth case and the eighth case may be considered a special case of the seventh case.

Figure 5:
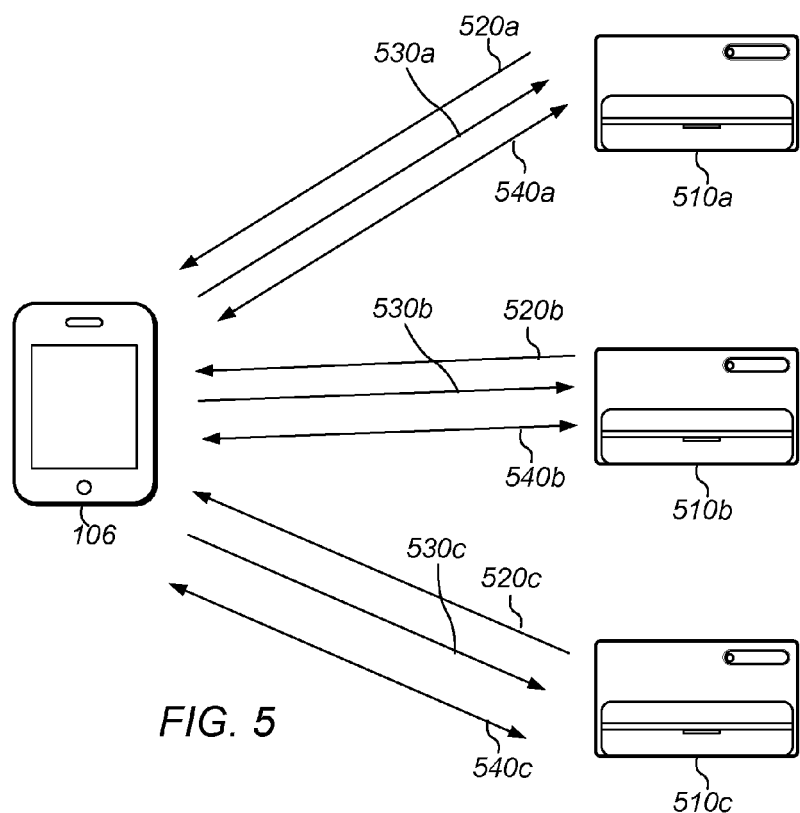
FIG. 5 illustrates an example of signaling between devices for a passive subscribe, by a subscribing device, to an unsolicited publish with the subscribing device performing BLE passive scanning, according to some embodiments.

FIG. 5 illustrates signaling between devices for a passive subscribe by a subscribing device to an unsolicited publish

|  |  |  | Subscriber | | | |
|---|---|---|---|---|---|---|
|  |  |  | Passive Subscribe | | Active Subscribe | |
|  |  |  | BLE Passive Scanning | BLE Active Scanning | BLE Passive Scanning | BLE Active Scanning |
| Publisher | Unsolicited Publish | BLE Passive Scanning | Case 1 | Case 2 | N/A | N/A |
|  |  | BLE Active Scanning | Case 3 | Case 4 | N/A | N/A |
|  | Solicited Publish | BLE Passive Scanning | N/A | N/A | Case 5 | Case 6 |
|  |  | BLE Active Scanning | N/A | N/A | Case 7 | Case 8 |

As another example, a second case (case 2) may also include a publisher performing an unsolicited publish while also performing BLE passive scanning. The second case may also include a subscriber performing a passive subscribe. However, unlike the first case (case 1), the subscriber may be performing BLE active scanning (e.g., listening or receiving ADV packets and requesting additional information regarding the advertisement) instead of BLE passive scanning.

A third case (case 3) may also include a publisher performing an unsolicited publish while a subscriber performs a passive subscribe. However, unlike the first case the publisher may be performing BLE active scanning while the subscriber performs BLE passive scanning.

A fourth case (case 4) may include a publisher performing an unsolicited publish while performing BLE active scanning. Additionally, a subscriber may be performing a passive subscribe while performing BLE active scanning.

Note that in some embodiments, the third case may be considered a special case of the first case and the fourth case may be considered a special case of the second case.

In a fifth case (case 5), which may be considered a reverse of the first case, a subscriber may be performing an active subscribe to a service while performing BLE passive scanning and a publisher may be performing a solicited publish of the service while performing BLE passive scanning.

with the subscribing device performing BLE passive scanning (e.g., case 1 of Table 1), according to some embodiments. The signaling shown in FIG. 5 may be used in conjunction with any of the systems or devices shown in the above Figures, among other devices. In various embodiments, some of the signaling shown may be performed concurrently, in a different order than shown, or may be omitted. Additional signaling may also be performed as desired.

As shown, a client station, such as client station 106, may discover multiple (e.g., one or more or at least one) devices, such as devices 510a-510c, e.g., via BLE discovery beacons. The client station may be seeking a service (e.g., such as a printing service), and may receive messages (or signals) 520a-520c respectively advertising services for devices 510a-510c. Messages 520a-520c may be received via BLE and, in some embodiments, may be ADV packets as described above in reference to FIGS. 4A-4C. In some embodiments, messages 520a-502c may include a service identifier, advertisement information (e.g., advertiser or seeker), and/or Wi-Fi status (e.g., Wi-Fi on or off).

Client station 106 may respond to messages 520a-520c via transmission of messages 530a-530c to devices 510a-510c. Thus, client station 106 may transmit message 530a to device 510a, message 530b to device 510b, and message 530c to device 510c. Messages 530a-530c may be connection request messages (e.g., a request to connect via BLE) as described above.

Devices 510a-510c may then each connect to client station 106 and further service information 540a-540c may be exchanged between client station 106 and devices 510a-510c, including GATT database queries.

Client station 106 may then determine whether any of devices 510a-510c provide a service match and further may determine whether to establish a data connection (e.g., a datapath) with any of devices 510a-510c. Thus, for example, client station 106 may determine a service match with device 510c, but not with devices 510a and 510b. Hence, client station 106 may disconnect from devices 510a and 510b and may further establish a data connection with device 510c.

Figure 6:
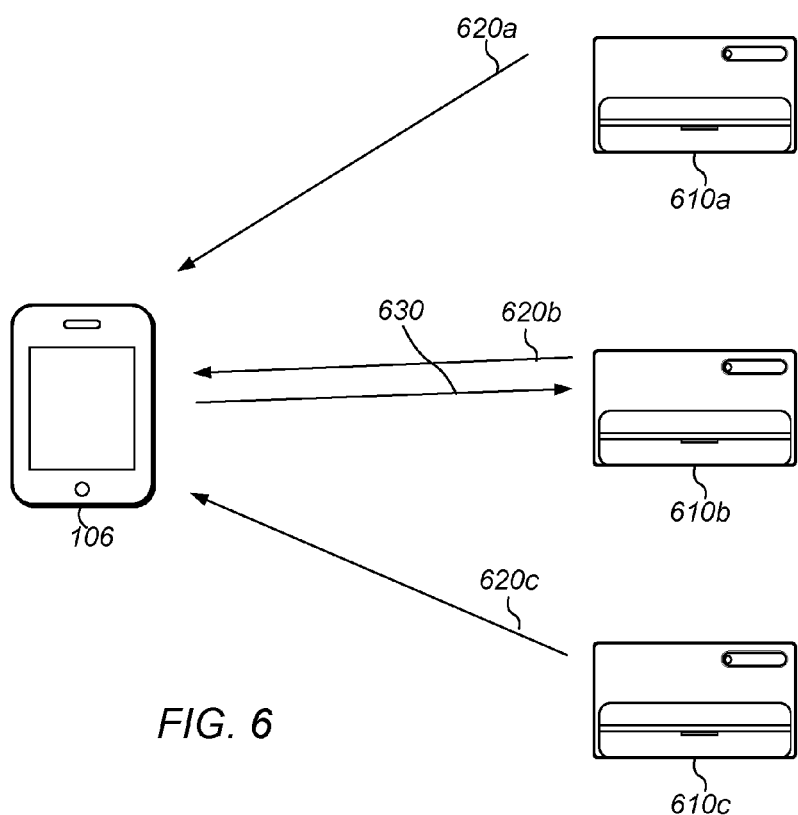
FIG. 6 illustrates an example of signaling between devices for a passive subscribe, by a subscribing device, to an unsolicited publish with the subscribing device performing BLE active scanning, according to some embodiments.

FIG. 6 illustrates signaling between devices for a passive subscribe by a subscribing device to an unsolicited publish with the subscribing device performing BLE active scanning (e.g., case 2 of Table 1), according to some embodiments. The signaling shown in FIG. 6 may be used in conjunction with any of the systems or devices shown in the above Figures, among other devices. In various embodiments, some of the signaling shown may be performed concurrently, in a different order than shown, or may be omitted. Additional signaling may also be performed as desired.

As shown, a client station, such as client station 106, may discover multiple (e.g., one or more or at least one) devices, such as devices 610a-610c, e.g., via BLE discovery beacons. The client station may be seeking a service (e.g., such as a printing service), and may receive messages (or signals) 620a-620c respectively advertising services for devices 610a-610c. Messages 620a-620c may be received via BLE and, in some embodiments, may be ADV packets as described above in reference to FIGS. 4A-4C. In some embodiments, messages 620a-602c may include a service identifier, advertisement information (e.g., advertiser or seeker), and/or Wi-Fi status (e.g., Wi-Fi on or off).

Client station 106 may then determine whether any of devices 610a-610c provide a service match and further may determine whether to establish a data connection (e.g., a datapath) with any of devices 610a-610c. Thus, for example, client station 106 may determine a service match with device 610b, but not with devices 610a and 610c. Hence, client station 106 may respond to device 610b via transmission of message 630. However, client station 106 may not respond to devices 610a or 610c. In some embodiments, message 630 may be a reverse advertisement packet (or message) as described above and may include a service identifier, advertisement information (e.g., advertiser or seeker), and/or Wi-Fi status (e.g., Wi-Fi on or off). For example, message 630 may include a service identifier matching a service identifier received in message 620b, advertisement information indicating client station 106 is a seeker, and/or information indicating that client station 106 has enabled (or turned on) Wi-Fi for a possible data connection with device 610b.

Figure 7:
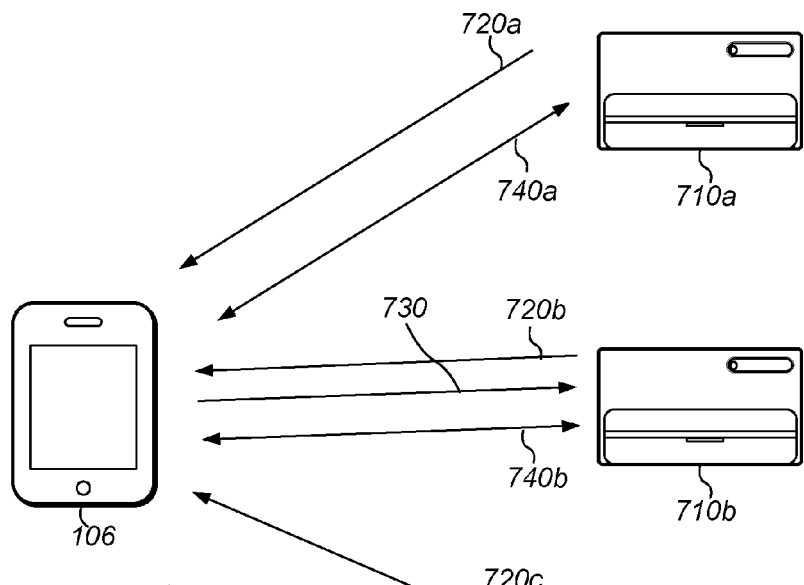
FIG. 7 illustrates an example of signaling between devices for an active subscribe, by a subscribing device, to a solicited publish with the subscribing device performing BLE passive scanning, according to some embodiments.

FIG. 7 illustrates signaling between devices for an active subscribe by a subscribing device to a solicited publish with the subscribing device performing BLE passive scanning (e.g., case 5 of Table 1), according to some embodiments. The signaling shown in FIG. 7 may be used in conjunction with any of the systems or devices shown in the above Figures, among other devices. In various embodiments, some of the signaling shown may be performed concurrently, in a different order than shown, or may be omitted. Additional signaling may also be performed as desired.

As shown, a client station, such as client station 106, may discover multiple (e.g., one or more or at least one) devices, such as devices 710a-710c, e.g., via BLE discovery beacons. The client station may be seeking a service (e.g., such as a printing service), and may broadcast a message 730. Message 730 may be an ADV packet as described above in reference to FIGS. 4A-4C. Thus, message 730 may include a service identifier, advertisement information (e.g., advertiser or seeker), and/or Wi-Fi status (e.g., Wi-Fi on or off). For example, message 630 may include a service identifier, advertisement information indicating client station 106 is a seeker, and/or information indicating that client station 106 has not enabled (or turned on) Wi-Fi.

Responsive to message 730, client station 106 may receive messages 720a-720c. Messages 720a-720c may be connection request messages (e.g., a request to connect via BLE). Thus, client station 106 may receive a connection request from devices 710a-710c based on broadcast of message 730.

Devices 710a-710c may then each connect to client station 106 and further service information 740a-740c may be exchanged between client station 106 and devices 710a-710c, including GATT database queries.

Client station 106 may then determine whether any of devices 710a-710c provide a service match and further may determine whether to establish a data connection (e.g., a datapath) with any of devices 710a-710c. Thus, for example, client station 106 may determine a service match with device 710c, but not with devices 710a and 710b. Hence, client station 106 may disconnect from devices 710a and 710b and may further establish a data connection with device 710c.

Figure 8:
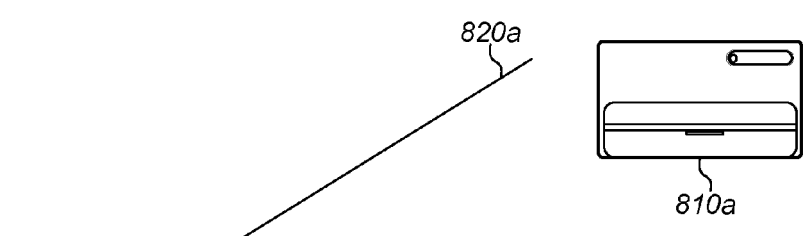
FIG. 8 illustrates an example of signaling between devices for an active subscribe, by a subscribing device, to a solicited publish with the subscribing device performing BLE active scanning, according to some embodiments.
Figure 8:
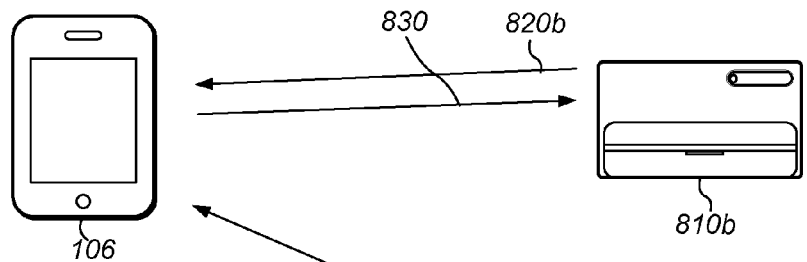

FIG. 8 illustrates signaling between devices for an active subscribe by a subscribing device to a solicited publish with the subscribing device performing BLE active scanning (e.g., case 6 of Table 1), according to some embodiments. The signaling shown in FIG. 8 may be used in conjunction with any of the systems or devices shown in the above Figures, among other devices. In various embodiments, some of the signaling shown may be performed concurrently, in a different order than shown, or may be omitted. Additional signaling may also be performed as desired.

As shown, a client station, such as client station 106, may discover multiple (e.g., one or more or at least one) devices, such as devices 810a-810c, e.g., via BLE discovery beacons. The client station may be seeking a service (e.g., such as a printing service), and may broadcast a message 830. Message 830 may be an ADV packet as described above in reference to FIGS. 4A-4C. Thus, message 830 may include a service identifier, advertisement information (e.g., advertiser or seeker), and/or Wi-Fi status (e.g., Wi-Fi on or off). For example, message 830 may include a service identifier, advertisement information indicating client station 106 is a seeker, and/or information indicating that client station 106 has not enabled (or turned on) Wi-Fi.

Responsive to message 830, messages 820a-820c may be received via BLE and, in some embodiments, may be reverse advertisement packets (or messages) as described above and may include a service identifier, advertisement information (e.g., advertiser or seeker), and/or Wi-Fi status (e.g., Wi-Fi on or off). For example, one or more of messages 820a-820c may include a service identifier matching a service identifier received in message 830, advertisement information indicating a device is an advertiser, and/or information indicating that the has enabled (or turned on) Wi-Fi for a possible data connection with client station.

Figure 9:
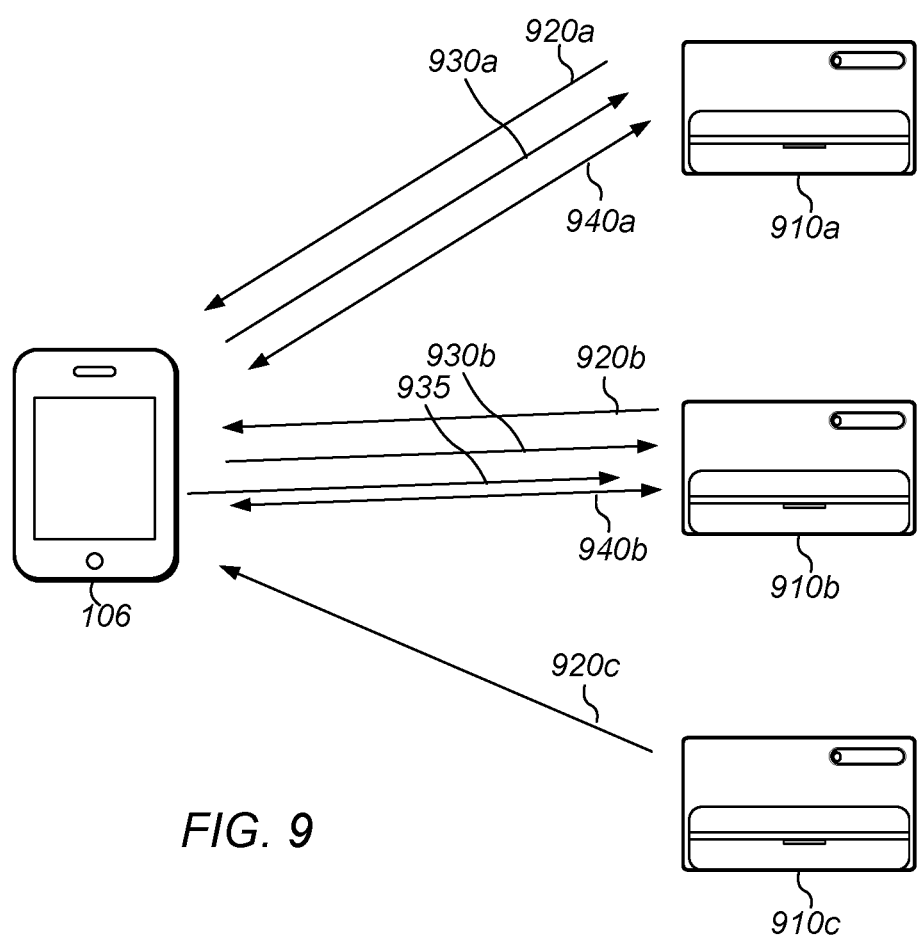
FIG. 9 illustrates another example of signaling between devices for an active subscribe, by a subscribing device, to a solicited publish with the subscribing device performing BLE active scanning, according to some embodiments.

FIG. 9 illustrates additional (or alternate) signaling between devices for an active subscribe by a subscribing device to a solicited publish with the subscribing device performing BLE active scanning (e.g., case 6 of Table 1), according to some embodiments. The signaling shown in FIG. 9 may be used in conjunction with any of the systems or devices shown in the above Figures, among other devices. In various embodiments, some of the signaling shown may be performed concurrently, in a different order than shown, or may be omitted. Additional signaling may also be performed as desired.

As shown, a client station, such as client station 106, may discover multiple (e.g., one or more or at least one) devices, such as devices 910a-910c, e.g., via BLE discovery beacons. The client station may be seeking a service (e.g., such as a printing service), and may broadcast a message 935. Message 935 may be an ADV packet as described above in reference to FIGS. 4A-4C. Thus, message 935 may include a service identifier, advertisement information (e.g., advertiser or seeker), and/or Wi-Fi status (e.g., Wi-Fi on or off). For example, message 935 may include a service identifier, advertisement information indicating client station 106 is a seeker, and/or information indicating that client station 106 has not enabled (or turned on) Wi-Fi.

Responsive to message 935, messages 920a-920c may be received via BLE and, in some embodiments, may be reverse advertisement packets (or messages) as described above and may include a service identifier, advertisement information (e.g., advertiser or seeker), and/or Wi-Fi status (e.g., Wi-Fi on or off). For example, one or more of messages 920a-920c may include a service identifier matching a service identifier received in message 935, advertisement information indicating a device is an advertiser, and/or information indicating that the has enabled (or turned on) Wi-Fi for a possible data connection with client station.

Responsive to messages 920a-920c, client station 106 may determine to transmit messages 930a-930b to devices 910a-910b, respectively. Transmission of messages 930a-930b may be based (at least in part) on a possible service match between client station 106 and one of devices 910a and 910b. For example, client station 106 may determine that device 910c is not a possible service match but devices 910a and 910b may be possible service matches. Thus, client station 106 may determine to exchange further information with devices 910a and 910b to determine whether either device is a service match. In some embodiments messages 930a and 930b may be connection request messages (e.g., a request to connect via BLE) as described above.

Devices 910a and 910b may then each connect to client station 106 and further service information 940a-940b may be exchanged between client station 106 and devices 910a-910b, including GATT database queries.

Client station 106 may then determine whether either of devices 910a or 910b provide a service match and further may determine whether to establish a data connection (e.g., a datapath) with either of the devices. Thus, for example, client station 106 may determine a service match with device 910b, but not with device 910a. Hence, client station 106 may disconnect from device 910a and may further establish a data connection with device 910b.

Unsolicited Publish & Passive Subscribe

FIGS. 10-14, described in detail below, illustrate various signaling diagrams for an unsolicited publisher and passive subscriber to establish a Wi-Fi connection via Bluetooth low energy (BLE) signaling, according to some embodiments. Note that BLE is used as an exemplary communication protocol in disclosed embodiments. However, another relatively lower power communication protocol can be used in place of BLE, such as Bluetooth or ZigBee. The signaling shown in FIGS. 10-14 may be used in conjunction with any of the systems or devices shown in the above Figures, among other devices. In various embodiments, some of the signaling shown may be performed concurrently, in a different order than shown, or may be omitted. Additional signaling may also be performed as desired.

Figure 10:
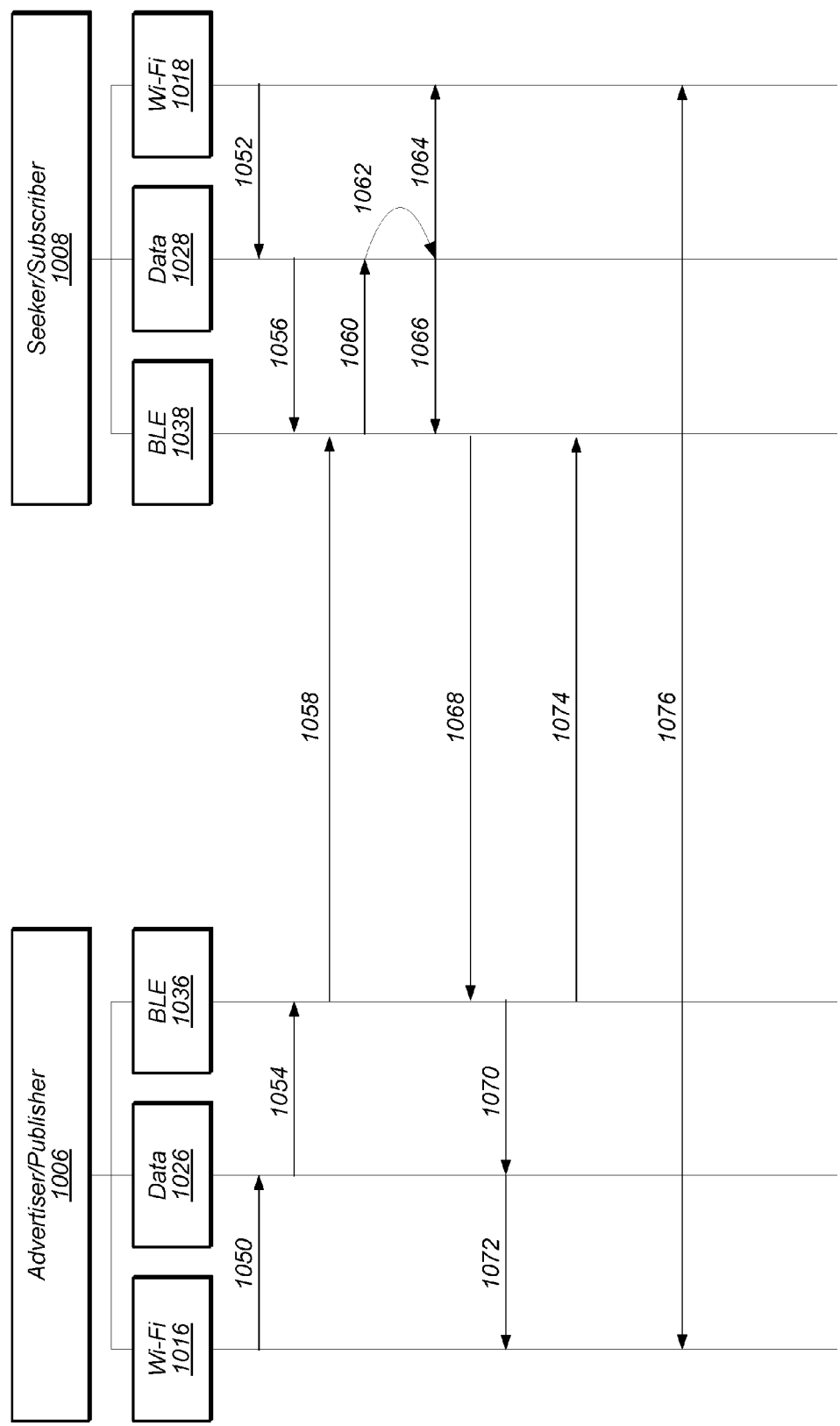
FIG. 10 illustrates an example signaling diagram between a publisher performing passive scanning and a subscriber performing passive scanning for an unsolicited publish of a service, according to some embodiments.

FIG. 10 illustrates a signaling diagram between a publisher performing passive scanning and a subscriber performing passive scanning for an unsolicited publish of a service, according to some embodiments. In other words, an advertiser (e.g., publisher), such as advertiser/publisher 1006, may be advertising services without solicitation (e.g., unsolicited publish), and a seeker (e.g., subscriber), such as seeker/subscriber 1008, may be passively seeking (or soliciting) for services. The publisher (e.g., advertiser/publisher 1006) may be performing a passive scan at a Bluetooth low energy (BLE) layer and the subscriber may be performing a passive scan at a BLE layer.

Advertiser/publisher 1006 and seeker/subscriber 1008 may each include features as described above with reference to client station 106. As shown, advertiser/publisher 1006 may include a Wi-Fi layer 1016 for performing Wi-Fi communications, a data access layer 1026 (e.g., an ASP 2.0 layer) for data access, and a BLE layer 1036 for performing Bluetooth (BT) communications. Additionally, as shown, seeker/subscriber 1008 may include a Wi-Fi layer 1018 for performing Wi-Fi communications, a data access layer 1028 for data access, and a BLE layer 1038 for performing Bluetooth (BT) communications.

At 1050, advertiser/publisher 1006 may pass an advertised service from Wi-Fi layer 1016 to data access layer 1026. Further, at 1054, data access layer 1026 may pass the advertised service to BLE layer 1036. At 1058, BLE layer 1036 may transmit a broadcast or unicast message (such as an ADV_IND message) advertising the service. The message may include information relating to transport status (e.g., whether Wi-Fi is on or off) and supported services, among other information. In some embodiments, the message may be sent multiple times. Further, BLE layer 1036 may passively scan for a response to the message.

At 1052, seeker/subscriber 1008 may pass a request to subscribe to a service from Wi-Fi layer 1018 to data access layer 1028. Further, at 1056, data access layer 1028 may pass the request to subscribe to BLE layer 1038. In response to receiving the request, BLE layer 1038 may passively scan for the requested service.

At 1060, BLE layer 1038 may receive the message advertising the service from BLE layer 1036 and may pass (or transmit) the message to data access layer 1028. At 1062, data access layer 1028 may determine a service match and may notify BLE layer 1038 and Wi-Fi layer 1018 of the service match at 1066 and 1064, respectively. In addition, at 1064, data access layer 1028 may send an instruction to Wi-Fi layer 1018 to enable (e.g., turn on) Wi-Fi capabilities. Further, at 1066, data access layer 1028 may send an instruction to BLE 1038 to respond to the publisher.

At 1068, BLE layer 1038 may send a response message (e.g., an ADV_IND response message) to BLE layer 1036. The response message may include information relating to transport status and supported services, among other information.

At 1070, BLE layer 1036 may pass the response message to data access layer 1026. At 1072, data access layer 1026 may send instructions to Wi-Fi layer 1016 to enable (e.g., turn on) Wi-Fi capabilities.

At 1074, BLE 1036 may acknowledge the response message with an updated message (e.g., another ADV_IND) to BLE layer 1038. The updated message may include updated transport information. At 1076, the devices may proceed to Wi-Fi discovery and connection and establishment of a NAN datapath via communications between Wi-Fi layer 1016 and Wi-Fi layer 1018.

Figure 11:
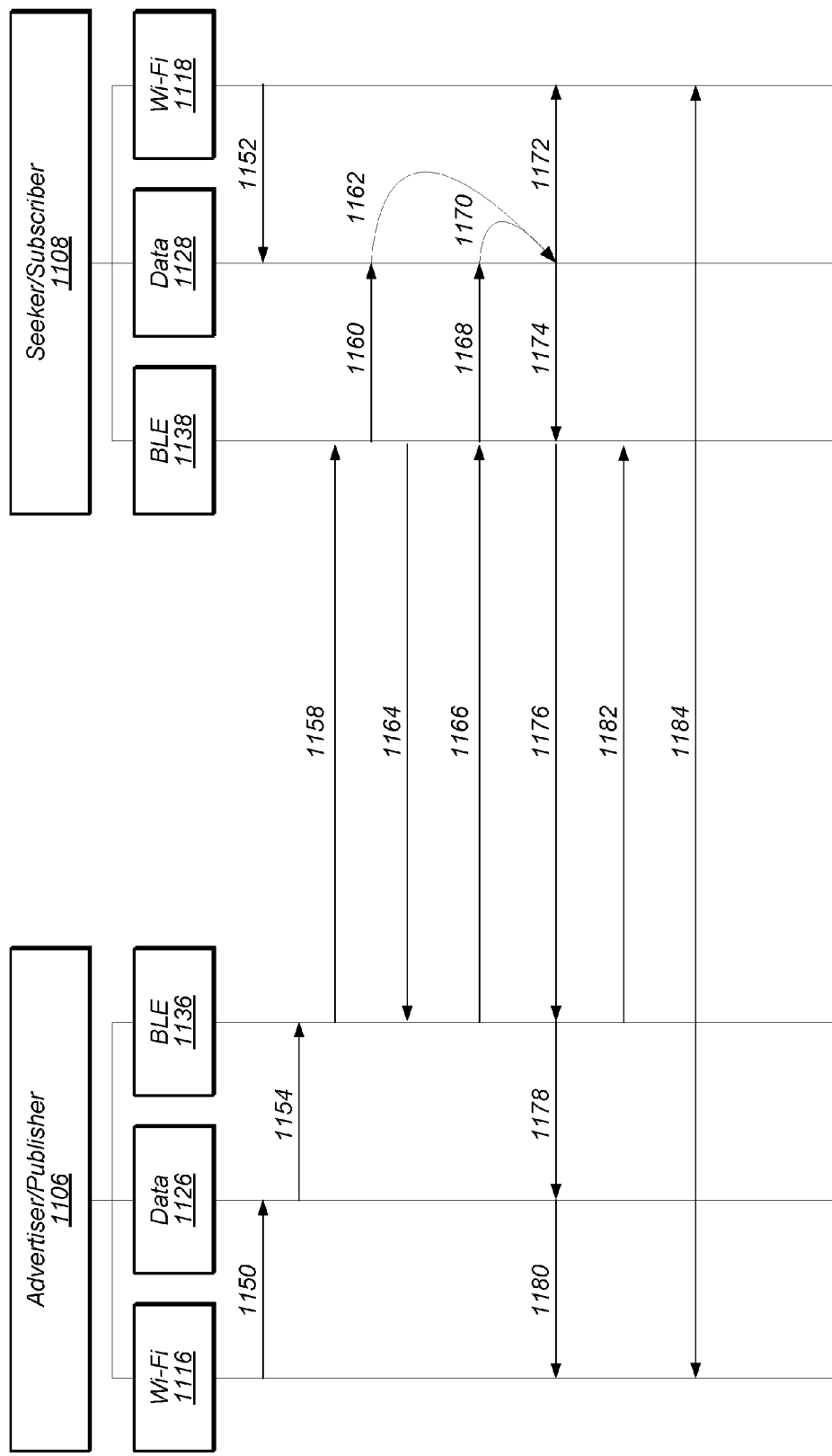
FIG. 11 illustrates an example signaling diagram between a publisher performing passive scanning and a subscriber performing active scanning for an unsolicited publish of a service, according to some embodiments.

FIG. 11 illustrates a signaling diagram between a publisher performing passive scanning and a subscriber performing active scanning for an unsolicited publish of a service, according to some embodiments. In other words, an advertiser (e.g., publisher), such as advertiser/publisher 1106, may be advertising services without solicitation (e.g., unsolicited publish), and a seeker (e.g., subscriber), such as seeker/subscriber 1108, may be passively seeking (or soliciting) for services. The publisher (e.g., advertiser/publisher 1106) may be performing a passive scan at a Bluetooth low energy (BLE) layer and the subscriber may be performing an active scan at a BLE layer.

Advertiser/publisher 1106 and seeker/subscriber 1108 may each include features as described above with reference to client station 106. As shown, advertiser/publisher 1106 may include a Wi-Fi layer 1116 for performing Wi-Fi communications, a data access layer 1126 (e.g., an ASP 2.0 layer) for data access, and a BLE layer 1136 for performing Bluetooth (BT) communications. Additionally, as shown, seeker/subscriber 1108 may include a Wi-Fi layer 1118 for performing Wi-Fi communications, a data access layer 1128 for data access, and a BLE layer 1138 for performing Bluetooth (BT) communications.

At 1150, advertiser/publisher 1106 may pass an advertised service from Wi-Fi layer 1116 to data access layer 1126. Further, at 1154, data access layer 1126 may pass the advertised service to BLE layer 1136. At 1158, BLE layer 1136 may transmit a broadcast or unicast message (such as an ADV_IND message) advertising the service. The message may include information relating to transport status (e.g., whether Wi-Fi is on or off) and supported services, among other information. In some embodiments, the message may be sent multiple times. Further, BLE layer 1136 may passively scan for a response to the message.

At 1152, seeker/subscriber 1108 may pass a request to subscribe to a service from Wi-Fi layer 1118 to data access layer 1128. In addition, BLE layer 1138 may actively scan for published services.

At 1160, BLE layer 1138 may receive the message advertising the service from BLE layer 1136 and may pass (or transmit) the message to data access layer 1128. At 1162, data access layer 1128 may determine a service match.

At 1164, BLE layer 1138 may send a request message (e.g., a SCAN_REQ) to BLE layer 1136. The request message may request further information regarding the service.

At 1166, BLE layer 1136 may send a response message (e.g., a SCAN_RES response message) to BLE layer 1138. The response message may include information relating to transport status and supported services, among other information.

At 1168, BLE layer 1138 may receive the response message and notify data access layer 1128. At 1170, data access layer 1128 may determine a device match (note that a service match was previously determined at 1162) and may notify BLE layer 1138 and Wi-Fi layer 1118 of the device and service match at 1174 and 1172, respectively. In addition, at 1172, data access layer 1128 may send an instruction to Wi-Fi layer 1118 to enable (e.g., turn on) Wi-Fi capabilities. Further, at 1174, data access layer 1128 may send an instruction to BLE 1138 to respond to the publisher.

At 1176, BLE layer 1138 may send a response message (e.g., an ADV_IND response message) to BLE layer 1136. The response message may include information relating to transport status and supported services, among other information.

At 1178, BLE layer 1136 may pass the response message to data access layer 1126. At 1180, data access layer 1126 may send instructions to Wi-Fi layer 1116 to enable (e.g., turn on) Wi-Fi capabilities.

At 1182, BLE 1136 may acknowledge the response message with an updated message (e.g., another ADV_IND) to BLE layer 1138. The updated message may include updated transport information. At 1184, the devices may proceed to Wi-Fi discovery and connection and establishment of a NAN datapath via communications between Wi-Fi layer 1116 and Wi-Fi layer 1118.

Figure 12:
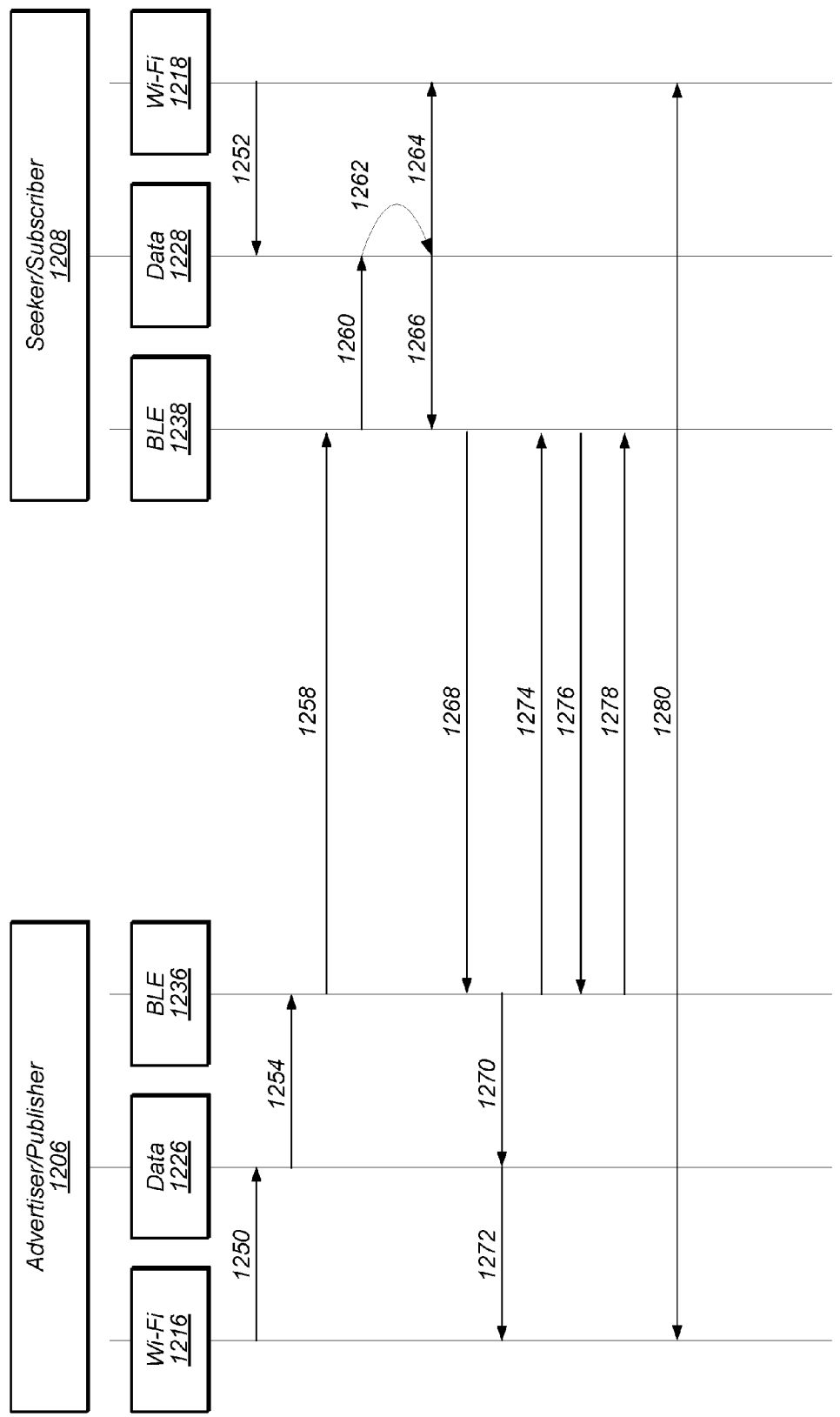
FIG. 12 illustrates an example signaling diagram between a publisher performing active scanning and a subscriber performing passive scanning for an unsolicited publish of a service, according to some embodiments.

FIG. 12 illustrates a signaling diagram between a publisher performing active scanning and a subscriber performing passive scanning for an unsolicited publish of a service, according to some embodiments. In other words, an advertiser (e.g., publisher), such as advertiser/publisher 1206, may be advertising services without solicitation (e.g., unsolicited publish), and a seeker (e.g., subscriber), such as seeker/subscriber 1208, may be passively seeking (or soliciting) for services. The publisher (e.g., advertiser/publisher 1206) may be performing an active scan at a Bluetooth low energy (BLE) layer and the subscriber may be performing a passive scan at a BLE layer.

Advertiser/publisher 1206 and seeker/subscriber 1208 may each include features as described above with reference to client station 106. As shown, advertiser/publisher 1206 may include a Wi-Fi layer 1216 for performing Wi-Fi communications, a data access layer 1226 (e.g., an ASP 2.0 layer) for data access, and a BLE layer 1236 for performing Bluetooth (BT) communications. Additionally, as shown, seeker/subscriber 1208 may include a Wi-Fi layer 1218 for performing Wi-Fi communications, a data access layer 1228 for data access, and a BLE layer 1238 for performing Bluetooth (BT) communications.

At 1250, advertiser/publisher 1206 may pass an advertised service from Wi-Fi layer 1216 to data access layer 1226. Further, at 1254, data access layer 1226 may pass the advertised service to BLE layer 1236. At 1258, BLE layer 1236 may transmit a broadcast or unicast message (such as an ADV_IND message) advertising the service. The message may include information relating to transport status (e.g., whether Wi-Fi is on or off) and supported services, among other information. In some embodiments, the message may be sent multiple times. Further, BLE layer 1236 may actively scan for a response to the message.

At 1252, seeker/subscriber 1208 may pass a request to subscribe to a service from Wi-Fi layer 1218 to data access layer 1228. Further, BLE layer 1238 may passively scan for the requested service.

At 1260, BLE layer 1238 may receive the message advertising the service from BLE layer 1236 and may pass (or transmit) the message to data access layer 1228. At 1262, data access layer 1228 may determine a service match and may notify BLE layer 1238 and Wi-Fi layer 1218 of the service match at 1266 and 1264, respectively. In addition, at 1264, data access layer 1228 may send an instruction to Wi-Fi layer 1218 to enable (e.g., turn on) Wi-Fi capabilities. Further, at 1266, data access layer 1228 may send an instruction to BLE 1238 to respond to the publisher.

At 1268, BLE layer 1238 may send a response message (e.g., an ADV_IND response message) to BLE layer 1236. The response message may include information relating to transport status and supported services, among other information.

At 1270, BLE layer 1236 may pass the response message to data access layer 1226. At 1272, data access layer 1226 may send instructions to Wi-Fi layer 1216 to enable (e.g., turn on) Wi-Fi capabilities.

At 1274, BLE 1236 may send a request message (e.g., a SCAN_REQ) to BLE layer 1238. The request message may request further information regarding the service.

At 1276, BLE layer 1238 may send a response message (e.g., a SCAN_RES response message) to BLE layer 1236. The response message may include information relating to transport status and supported services, among other information.

At 1276, BLE layer 1236 may send a response message (e.g., an ADV_IND response message) to BLE layer 1238. The response message may include information relating to transport status and supported services, among other information. In addition, the response message may be sent multiple times.

At 1280, the devices may proceed to Wi-Fi discovery and connection and establishment of a NAN datapath via communications between Wi-Fi layer 1216 and Wi-Fi layer 1218.

Figure 13:
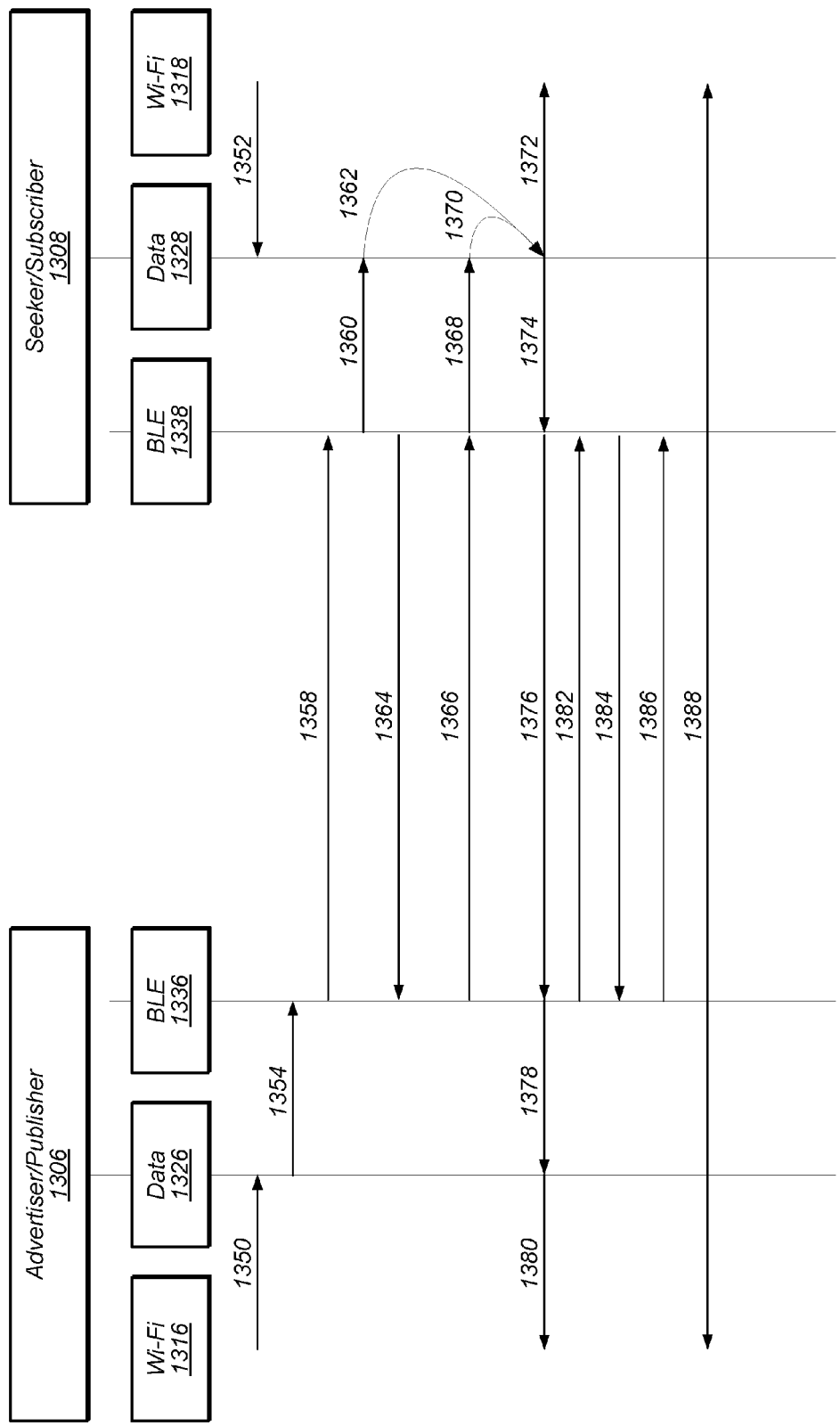
FIG. 13 illustrates an example signaling diagram between a publisher performing active scanning and a subscriber performing active scanning for an unsolicited publish of a service, according to some embodiments.

FIG. 13 illustrates a signaling diagram between a publisher performing active scanning and a subscriber performing passive scanning for an unsolicited publish of a service, according to some embodiments. In other words, an advertiser (e.g., publisher), such as advertiser/publisher 1306, may be advertising services without solicitation (e.g., unsolicited publish), and a seeker (e.g., subscriber), such as seeker/subscriber 1308, may be passively seeking (or soliciting) for services. The publisher (e.g., advertiser/publisher 1306) may be performing an active scan at a Bluetooth low energy (BLE) layer and the subscriber may be performing an active scan at a BLE layer.

Advertiser/publisher 1306 and seeker/subscriber 1308 may each include features as described above with reference to client station 106. As shown, advertiser/publisher 1306 may include a Wi-Fi layer 1316 for performing Wi-Fi communications, a data access layer 1326 (e.g., an ASP 2.0 layer) for data access, and a BLE layer 1336 for performing Bluetooth (BT) communications. Additionally, as shown, seeker/subscriber 1308 may include a Wi-Fi layer 1318 for performing Wi-Fi communications, a data access layer 1328 for data access, and a BLE layer 1338 for performing Bluetooth (BT) communications.

At 1350, advertiser/publisher 1306 may pass an advertised service from Wi-Fi layer 1316 to data access layer 1326. Further, at 1354, data access layer 1326 may pass the advertised service to BLE layer 1336. At 1358, BLE layer 1336 may transmit a broadcast or unicast message (such as an ADV_IND message) advertising the service. The message may include information relating to transport status (e.g., whether Wi-Fi is on or off) and supported services, among other information. In some embodiments, the message may be sent multiple times. Further, BLE layer 1336 may actively scan for a response to the message.

At 1352, seeker/subscriber 1308 may pass a request to subscribe to a service from Wi-Fi layer 1318 to data access layer 1328. Further, BLE layer 1338 may actively scan for the requested service.

At 1360, BLE layer 1338 may receive the message advertising the service from BLE layer 1336 and may pass (or transmit) the message to data access layer 1328. At 1362, data access layer 1328 may determine a service match.

At 1364, BLE layer 1338 may send a request message (e.g., a SCAN_REQ) to BLE layer 1336. The request message may request further information regarding the service.

At 1366, BLE layer 1336 may send a response message (e.g., a SCAN_RES response message) to BLE layer 1338. The response message may include information relating to transport status and supported services, among other information.

At 1368, BLE layer 1338 may receive the response message and notify data access layer 1328. At 1370, data access layer 1328 may determine a device match (note that a service match was previously determined at 1362) and may notify BLE layer 1338 and Wi-Fi layer 1318 of the device and service match at 1374 and 1372, respectively. In addition, at 1372, data access layer 1328 may send an instruction to Wi-Fi layer 1318 to enable (e.g., turn on) Wi-Fi capabilities. Further, at 1374, data access layer 1328 may send an instruction to BLE 1338 to respond to the publisher.

At 1376, BLE layer 1338 may send a response message (e.g., an ADV_IND response message) to BLE layer 1336. The response message may include information relating to transport status and supported services, among other information.

At 1378, BLE layer 1336 may pass the response message to data access layer 1326. At 1380, data access layer 1326 may send instructions to Wi-Fi layer 1316 to enable (e.g., turn on) Wi-Fi capabilities.

At 1382, BLE 1336 may send a request message (e.g., a SCAN_REQ) to BLE layer 1338. The request message may request further information regarding the service.

At 1384, BLE layer 1338 may send a response message (e.g., a SCAN_RES response message) to BLE layer 1336. The response message may include information relating to transport status and supported services, among other information.

At 1386, BLE layer 1336 may send a response message (e.g., an ADV_IND response message) to BLE layer 1338. The response message may include information relating to transport status and supported services, among other information. In addition, the response message may be sent multiple times.

At 1388, the devices may proceed to Wi-Fi discovery and connection and establishment of a NAN datapath via communications between Wi-Fi layer 1316 and Wi-Fi layer 1318.

Figure 14:
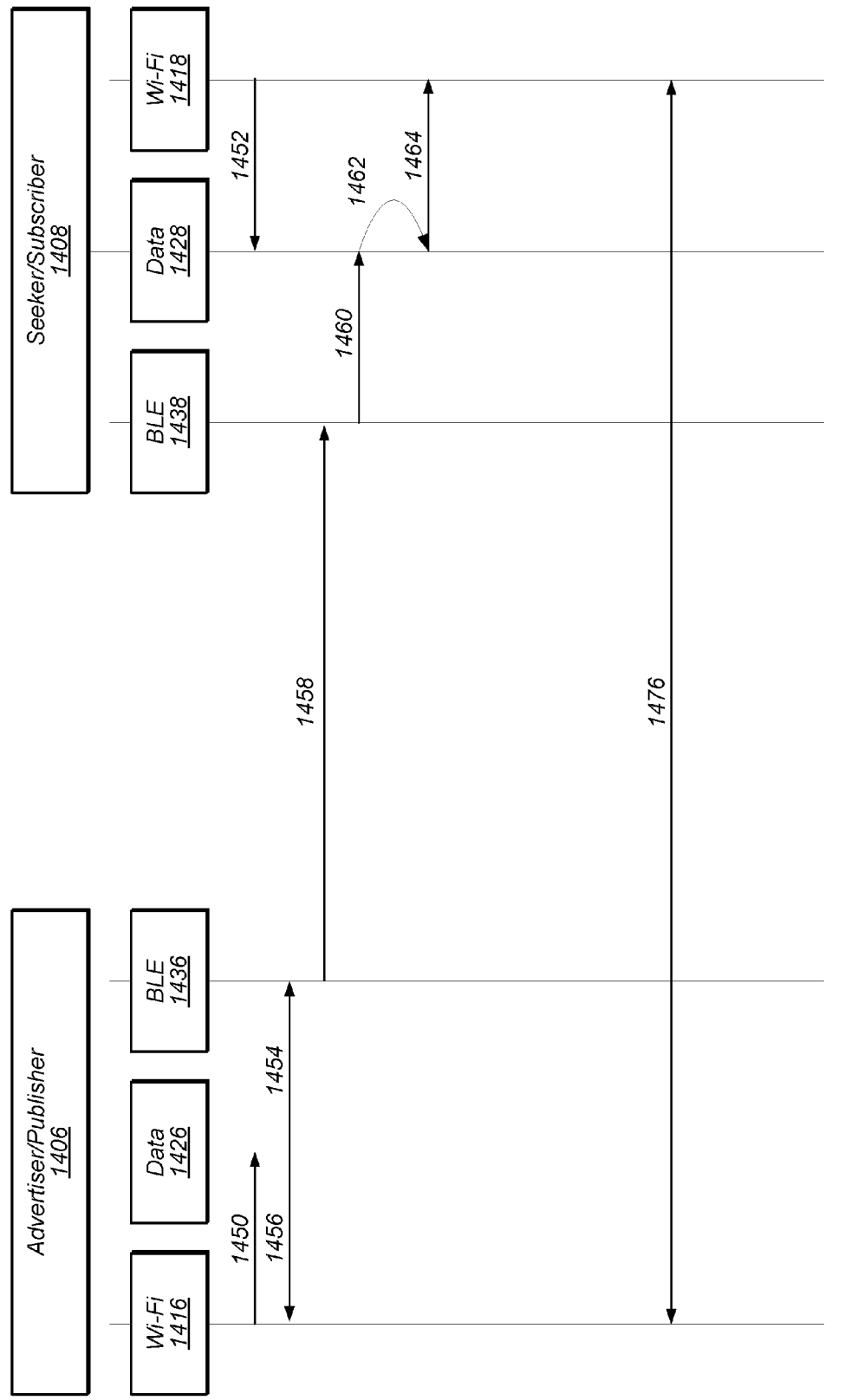
FIG. 14 illustrates an example signaling diagram between a publisher performing passive scanning and a subscriber performing passive scanning for an unsolicited publish of a service, according to some embodiments.

FIG. 14 illustrates a signaling diagram between a publisher performing passive scanning and a subscriber performing passive scanning for an unsolicited publish of a service, according to some embodiments. In other words, an advertiser (e.g., publisher), such as advertiser/publisher 1406, may be advertising services without solicitation (e.g., unsolicited publish), and a seeker (e.g., subscriber), such as seeker/subscriber 1408, may be passively seeking (or soliciting) for services. The publisher (e.g., advertiser/publisher 1406) may be performing a passive scan at a Bluetooth low energy (BLE) layer and the subscriber may be performing a passive scan at a BLE layer.

Advertiser/publisher 1406 and seeker/subscriber 1408 may each include features as described above with reference to client station 106. As shown, advertiser/publisher 1406 may include a Wi-Fi layer 1416 for performing Wi-Fi communications, a data access layer 1426 (e.g., an ASP 2.0 layer) for data access, and a BLE layer 1436 for performing Bluetooth (BT) communications. Additionally, as shown, seeker/subscriber 1408 may include a Wi-Fi layer 1418 for performing Wi-Fi communications, a data access layer 1428 for data access, and a BLE layer 1438 for performing Bluetooth (BT) communications.

At 1450, advertiser/publisher 1406 may pass an advertised service from Wi-Fi layer 1416 to data access layer 1426. Further, at 1454, data access layer 1426 may pass the advertised service to BLE layer 1436. In addition, at 1456, data access layer 1426 may send an instruction to Wi-Fi layer 1416 to enable (e.g., turn on) Wi-Fi capabilities.

At 1458, BLE layer 1436 may transmit a broadcast or unicast message (such as an ADV_IND or ADV_NONCON-N_IND message) advertising the service. The message may include information relating to transport status (e.g., Wi-Fi is on) and supported services, among other information. In some embodiments, the message may be sent multiple times. Further, BLE layer 1436 may passively scan for a response to the message.

At 1452, seeker/subscriber 1408 may pass a request to subscribe to a service from Wi-Fi layer 1418 to data access layer 1428.

At 1460, BLE layer 1438 may receive the message advertising the service from BLE layer 1436 and may pass (or transmit) the message to data access layer 1428. At 1462, data access layer 1428 may determine a service match and may notify Wi-Fi layer 1418 of the service match at 1464. In addition, at 1464, data access layer 1428 may send an instruction to Wi-Fi layer 1418 to enable (e.g., turn on) Wi-Fi capabilities.

At 1476, the devices may proceed to Wi-Fi discovery and connection and establishment of a NAN datapath via communications between Wi-Fi layer 1416 and Wi-Fi layer 1418.

Solicited Publish & Active Subscribe

FIGS. 15-20 illustrate various signaling diagrams for a solicited publisher and active subscriber to establish a Wi-Fi connection via Bluetooth low energy (BLE) signaling, according to some embodiments. Note that BLE is used as an exemplary communication protocol in disclosed embodiments. However, another relatively lower power communication protocol can be used in place of BLE, such as Bluetooth or ZigBee. The signaling shown in FIGS. 15-20 may be used in conjunction with any of the systems or devices shown in the above Figures, among other devices. In various embodiments, some of the signaling shown may be performed concurrently, in a different order than shown, or may be omitted. Additional signaling may also be performed as desired.

Figure 15:
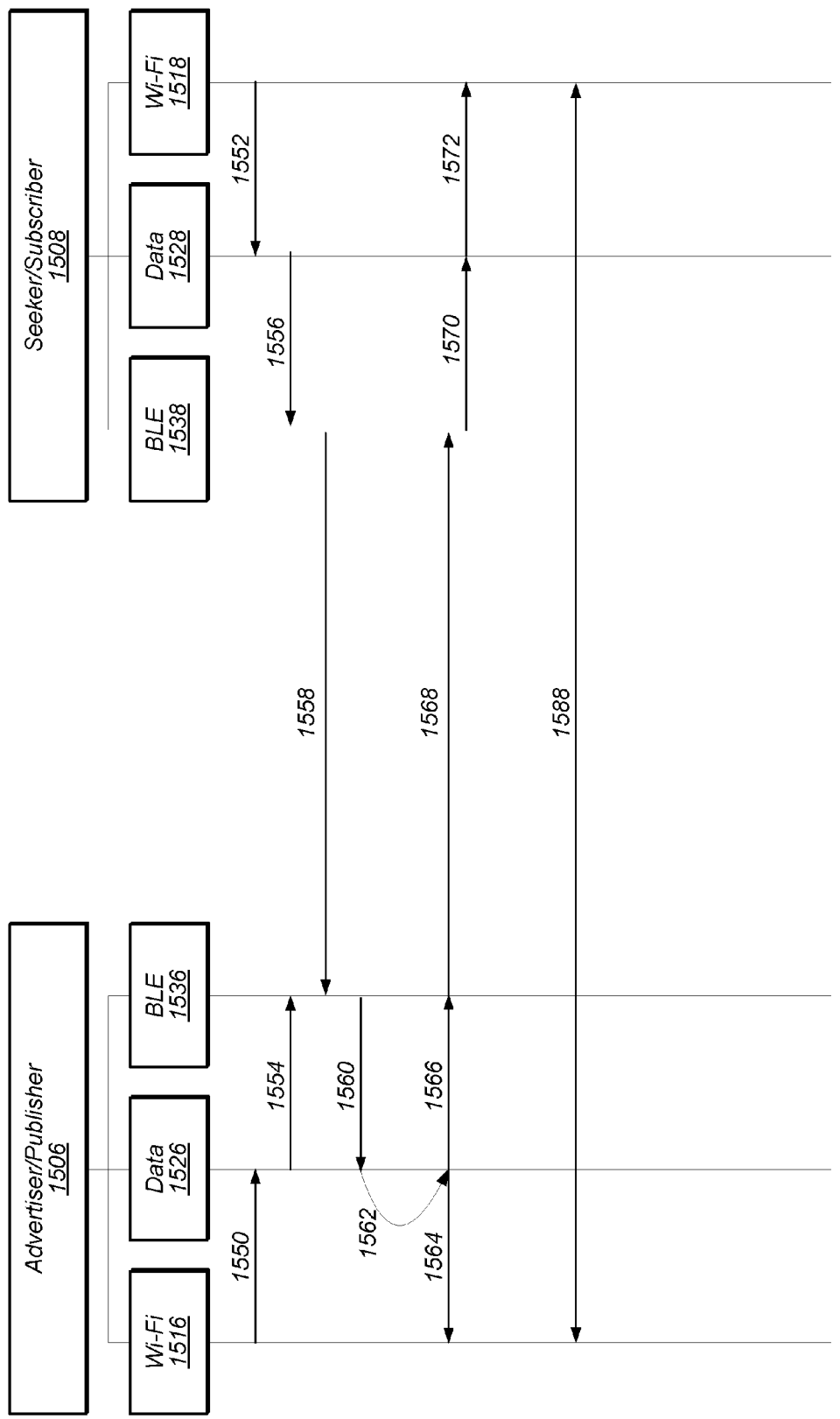
FIG. 15 illustrates an example signaling diagram between a publisher performing passive scanning and a subscriber performing passive scanning for a solicited publish of a service, according to some embodiments.

FIG. 15 illustrates a signaling diagram between a publisher performing passive scanning and a subscriber performing passive scanning for a solicited publish of a service, according to some embodiments. In other words, an advertiser (e.g., publisher), such as advertiser/publisher 1506, may be advertising services only when solicited (e.g., solicited publish), and a seeker (e.g., subscriber), such as seeker/subscriber 1508, may be actively seeking (or soliciting) services. The publisher (e.g., advertiser/publisher 1506) may be performing a passive scan at a Bluetooth low energy (BLE) layer and the subscriber may be performing a passive scan at a BLE layer.

Advertiser/publisher 1506 and seeker/subscriber 1508 may each include features as described above with reference to client station 106. As shown, advertiser/publisher 1506 may include a Wi-Fi layer 1516 for performing Wi-Fi communications, a data access layer 1526 (e.g., an ASP 2.0 layer) for data access, and a BLE layer 1536 for performing Bluetooth (BT) communications. Additionally, as shown, seeker/subscriber 1508 may include a Wi-Fi layer 1518 for performing Wi-Fi communications, a data access layer 1528 for data access, and a BLE layer 1538 for performing Bluetooth (BT) communications.

At 1550, advertiser/publisher 1506 may pass an advertised service from Wi-Fi layer 1516 to data access layer 1526. Further, at 1554, data access layer 1526 may pass the advertised service to BLE layer 1536. In addition, BLE layer 1536 may passively scan for requests for the service.

At 1552, seeker/subscriber 1508 may pass a request to subscribe to a service from Wi-Fi layer 1518 to data access layer 1528. Further, at 1556, data access layer 1528 may pass the request to subscribe to BLE layer 1538. At 1558, in response to receiving the request, BLE layer 1538 may transmit a broadcast or unicast message (such as an ADV_IND message) soliciting the service. The message may include information relating to transport status (e.g., whether Wi-Fi is on or off) and supported (or desired) services, among other information. In some embodiments, the message may be sent multiple times. Further, BLE layer 1538 may passively scan for a response to the message.

At 1560, BLE layer 1536 may receive the message soliciting the service from BLE layer 1536 and may pass (or transmit) the message to data access layer 1526. At 1562, data access layer 1526 may determine a service match and may notify BLE layer 1536 and Wi-Fi layer 1515 of the service match at 1566 and 1564, respectively. In addition, at 1564, data access layer 1526 may send an instruction to Wi-Fi layer 1516 to enable (e.g., turn on) Wi-Fi capabilities. Further, at 1566, data access layer 1526 may send an instruction to BLE 1536 to respond to the subscriber.

At 1568, BLE layer 1536 may send a response message (e.g., an ADV_IND response message) to BLE layer 1538. The response message may include information relating to transport status and supported services, among other information.

At 1570, BLE layer 1538 may pass the response message to data access layer 1528. At 1572, data access layer 1528 may send instructions to Wi-Fi layer 1518 to enable (e.g., turn on) Wi-Fi capabilities.

At 1588, the devices may proceed to Wi-Fi discovery and connection and establishment of a NAN datapath via communications between Wi-Fi layer 1516 and Wi-Fi layer 1518.

Figure 16:
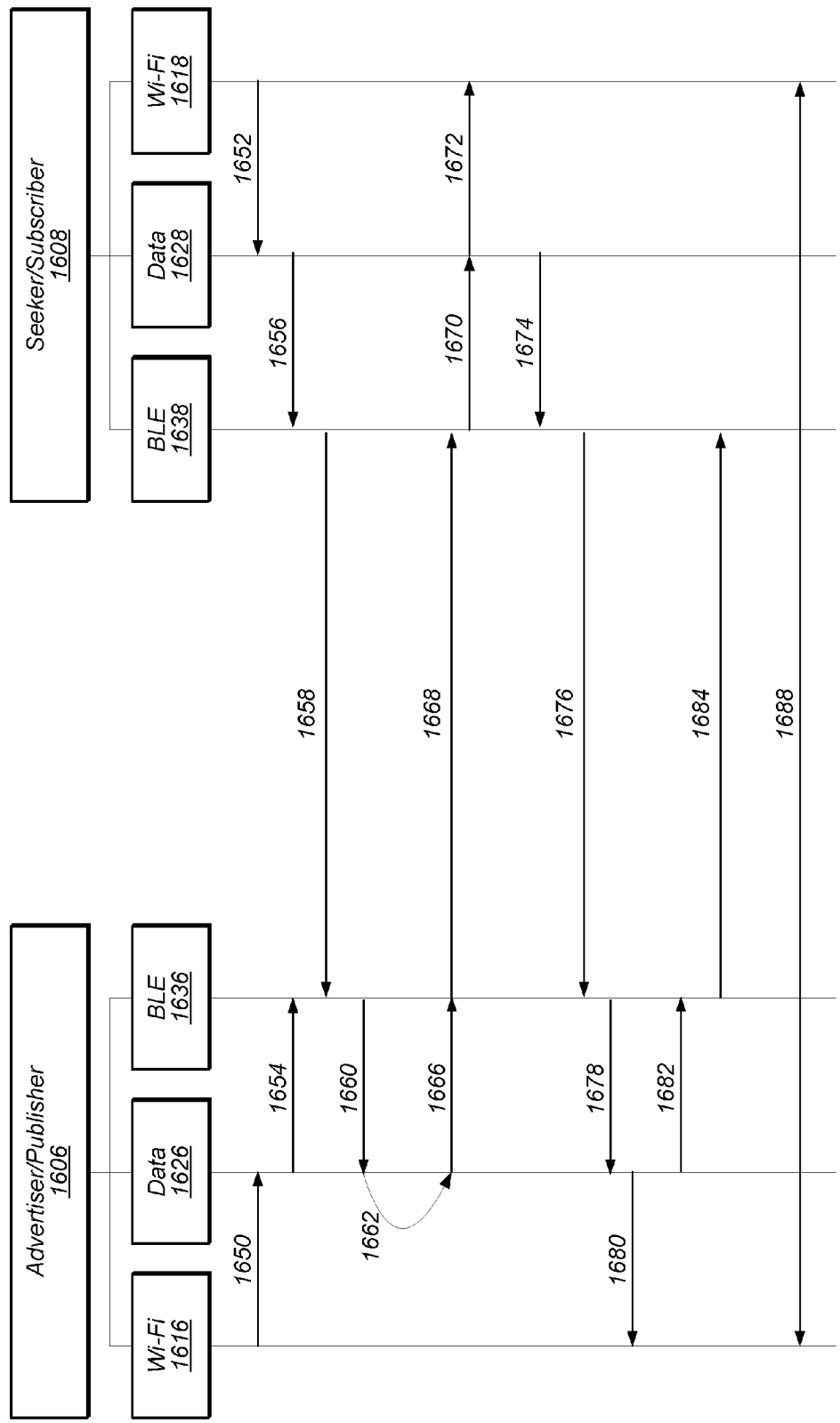
FIG. 16 illustrates an example signaling diagram between a publisher performing passive scanning and a subscriber performing passive scanning for a solicited publish of a service in which the publisher may conserve power via delaying enablement of an alternate transport, according to some embodiments.

FIG. 16 illustrates a signaling diagram between a publisher performing passive scanning and a subscriber performing passive scanning for a solicited publish of a service in which the publisher may conserve power via delaying enablement of alternate transport, according to some embodiments. In other words, an advertiser (e.g., publisher), such as advertiser/publisher 1606, may be advertising services only when solicited (e.g., solicited publish), and a seeker (e.g., subscriber), such as seeker/subscriber 1608, may be actively seeking (or soliciting) services. The publisher (e.g., advertiser/publisher 1606) may be performing a passive scan at a Bluetooth low energy (BLE) layer and the subscriber may be performing a passive scan at a BLE layer.

Advertiser/publisher 1606 and seeker/subscriber 1608 may each include features as described above with reference to client station 106. As shown, advertiser/publisher 1606 may include a Wi-Fi layer 1616 for performing Wi-Fi communications, a data access layer 1626 (e.g., an ASP 2.0 layer) for data access, and a BLE layer 1636 for performing Bluetooth (BT) communications. Additionally, as shown, seeker/subscriber 1608 may include a Wi-Fi layer 1618 for performing Wi-Fi communications, a data access layer 1628 for data access, and a BLE layer 1638 for performing Bluetooth (BT) communications.

At 1650, advertiser/publisher 1606 may pass an advertised service from Wi-Fi layer 1616 to data access layer 1626. Further, at 1654, data access layer 1626 may pass the advertised service to BLE layer 1636. In addition, BLE layer 1636 may passively scan for requests for the service.

At 1652, seeker/subscriber 1608 may pass a request to subscribe to a service from Wi-Fi layer 1618 to data access layer 1628. Further, at 1656, data access layer 1628 may pass the request to subscribe to BLE layer 1638. At 1658, in response to receiving the request, BLE layer 1638 may transmit a broadcast or unicast message (such as an ADV_IND message) soliciting the service. The message may include information relating to transport status (e.g., whether Wi-Fi is on or off) and supported (or desired) services, among other information. In some embodiments, the message may be sent multiple times. Further, BLE layer 1638 may passively scan for a response to the message.

At 1660, BLE layer 1636 may receive the message soliciting the service from BLE layer 1636 and may pass (or transmit) the message to data access layer 1626. At 1662, data access layer 1626 may determine a service match and may notify BLE layer 1636 of the service match at 1666 (note that data access layer 1626 may not notify Wi-Fi layer 1616 of the service match in order to conserve power). Further, at 1666, data access layer 1626 may send an instruction to BLE 1636 to respond to the subscriber.

At 1668, BLE layer 1636 may send a response message (e.g., an ADV_IND response message) to BLE layer 1638. The response message may include information relating to transport status (e.g., transport off) and supported services, among other information.

At 1670, BLE layer 1638 may pass the response message to data access layer 1628. At 1672, data access layer 1628 may send instructions to Wi-Fi layer 1618 to enable (e.g., turn on) Wi-Fi capabilities. At 1674, data access layer 1628 may send instructions to BLE layer 1638 to respond to the response message.

At 1676, BLE layer 1638 may send an updated response message (e.g., an ADV_IND response message) to BLE layer 1636. The response message may indicate that Wi-Fi capabilities have been enabled for seeker/subscriber 1608.

At 1678, BLE 1636 may pass the updated response to data access layer 1626 and, at 1680, data access layer 1626 may send instructions to Wi-Fi layer 1616 to enable Wi-Fi capabilities. In addition, at 1682, data access layer 1626 may send instructions to BLE 1636 to transmit an updated response, including an update that Wi-Fi has been enabled for advertiser/publisher 1606, to BLE 1638.

At 1684, BLE layer 1636 may send an updated response message (e.g., an ADV_IND response message) to BLE layer 1638 indicating the updated Wi-Fi capabilities of advertiser/publisher 1606.

At 1688, the devices may proceed to Wi-Fi discovery and connection and establishment of a NAN datapath via communications between Wi-Fi layer 1616 and Wi-Fi layer 1618.

Figure 17:
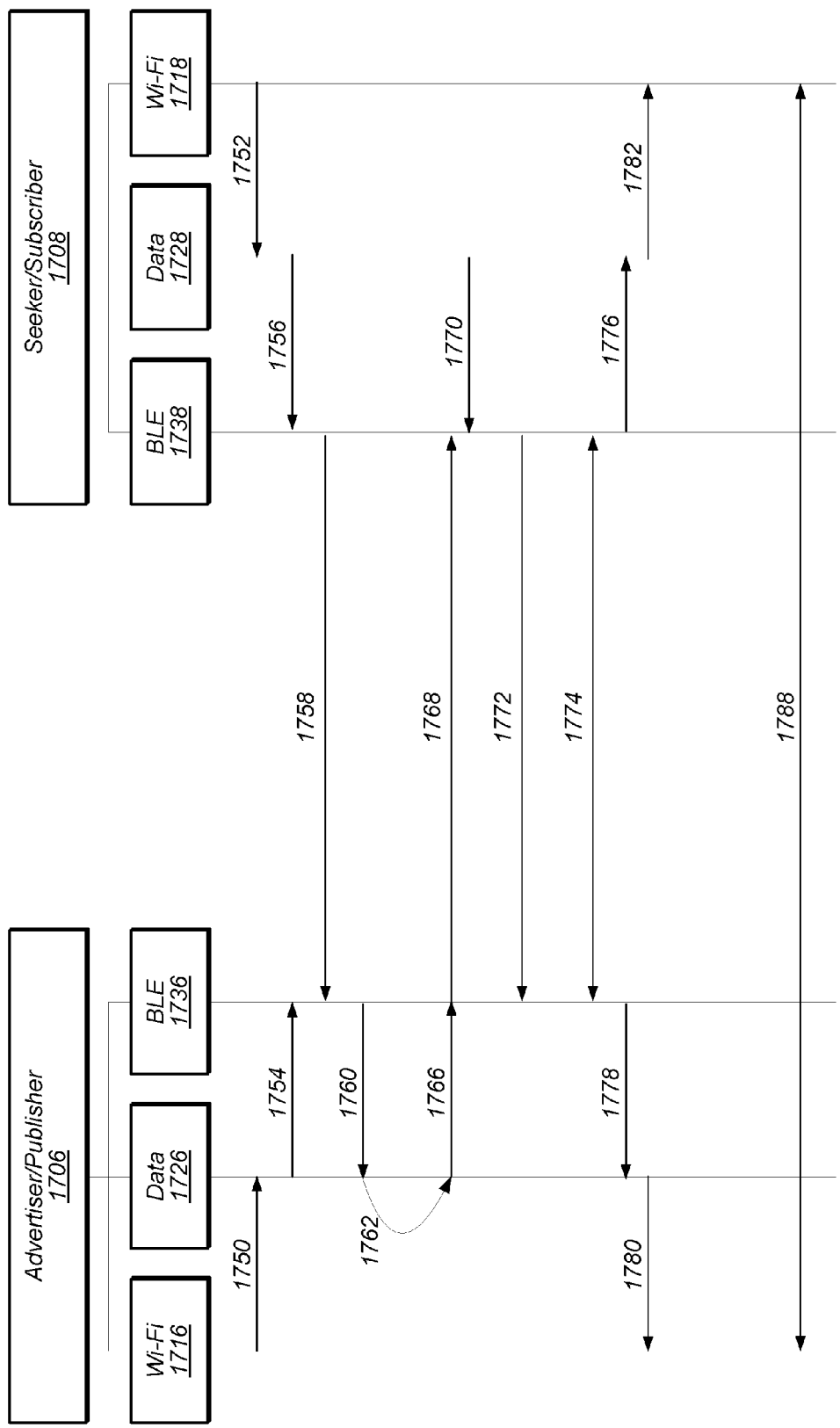
FIG. 17 illustrates an example signaling diagram between a publisher performing passive scanning and a subscriber performing passive scanning for a solicited publish of a service in which the subscriber and publisher use GATT database queries to establish a connection, according to some embodiments.

FIG. 17 illustrates a signaling diagram between a publisher performing passive scanning and a subscriber performing passive scanning for a solicited publish of a service in which the subscriber and publisher use GATT database queries to establish a connection, according to some embodiments. In other words, an advertiser (e.g., publisher), such as advertiser/publisher 1706, may be advertising services only when solicited (e.g., solicited publish), and a seeker (e.g., subscriber), such as seeker/subscriber 1708, may be actively seeking (or soliciting) services. The publisher (e.g., advertiser/publisher 1706) may be performing a passive scan at a Bluetooth low energy (BLE) layer and the subscriber may be performing a passive scan at a BLE layer.

Advertiser/publisher 1706 and seeker/subscriber 1708 may each include features as described above with reference to client station 106. As shown, advertiser/publisher 1706 may include a Wi-Fi layer 1716 for performing Wi-Fi communications, a data access layer 1726 (e.g., an ASP 2.0 layer) for data access, and a BLE layer 1736 for performing Bluetooth (BT) communications. Additionally, as shown, seeker/subscriber 1708 may include a Wi-Fi layer 1718 for performing Wi-Fi communications, a data access layer 1728 for data access, and a BLE layer 1738 for performing Bluetooth (BT) communications.

At 1750, advertiser/publisher 1706 may pass an advertised service from Wi-Fi layer 1716 to data access layer 1726. Further, at 1754, data access layer 1726 may pass the advertised service to BLE layer 1736. In addition, BLE layer 1736 may passively scan for requests for the service.

At 1752, seeker/subscriber 1708 may pass a request to subscribe to a service from Wi-Fi layer 1718 to data access layer 1728. Further, at 1756, data access layer 1728 may pass the request to subscribe to BLE layer 1738. At 1758, in response to receiving the request, BLE layer 1738 may transmit a broadcast or unicast message (such as an ADV_IND message) soliciting the service. The message may include information relating to transport status (e.g., whether Wi-Fi is on or off) and supported (or desired) services, among other information. In some embodiments, the message may be sent multiple times. Further, BLE layer 1738 may passively scan for a response to the message.

At 1760, BLE layer 1736 may receive the message soliciting the service from BLE layer 1736 and may pass (or transmit) the message to data access layer 1726. At 1762, data access layer 1726 may determine a service match and may notify BLE layer 1736 of the service match at 1766 (note that data access layer 1726 may not notify Wi-Fi layer 1716 of the service match in order to conserve power). Further, at 1766, data access layer 1726 may send an instruction to BLE 1736 to respond to the subscriber.

At 1768, BLE layer 1736 may send a response message (e.g., an ADV_IND response message) to BLE layer 1738. The response message may include information relating to transport status (e.g., transport off) and supported services, among other information.

At 1770, data access layer 1728 may send instructions to BLE layer 1738 to transmit a connection request message (e.g., a CONNECT_REQ message) to BLE layer 1736 and, at 1772, BLE layer 1738 may transmit the connection request message.

At 1774, BLE layers 1736 and 1738 may exchange communications (e.g., via a low energy connection) including GATT database queries.

At 1776, BLE layer 1738 may send the GATT database query results to data access layer 1728 and at 1778, BLE layer 1736 may send the GATT database query results to data access layer 1726.

At 1780, data access layer 1726 may send instructions to Wi-Fi layer 1716 to enable Wi-Fi capabilities for advertiser/publisher 1706, and, similarly, at 1782, data access layer 1728 may send instructions to Wi-Fi layer 1718 to enable Wi-Fi capabilities for seeker/subscriber 1708.

At 1788, the devices may proceed to Wi-Fi discovery and connection and establishment of a NAN datapath via communications between Wi-Fi layer 1716 and Wi-Fi layer 1718.

Figure 18:
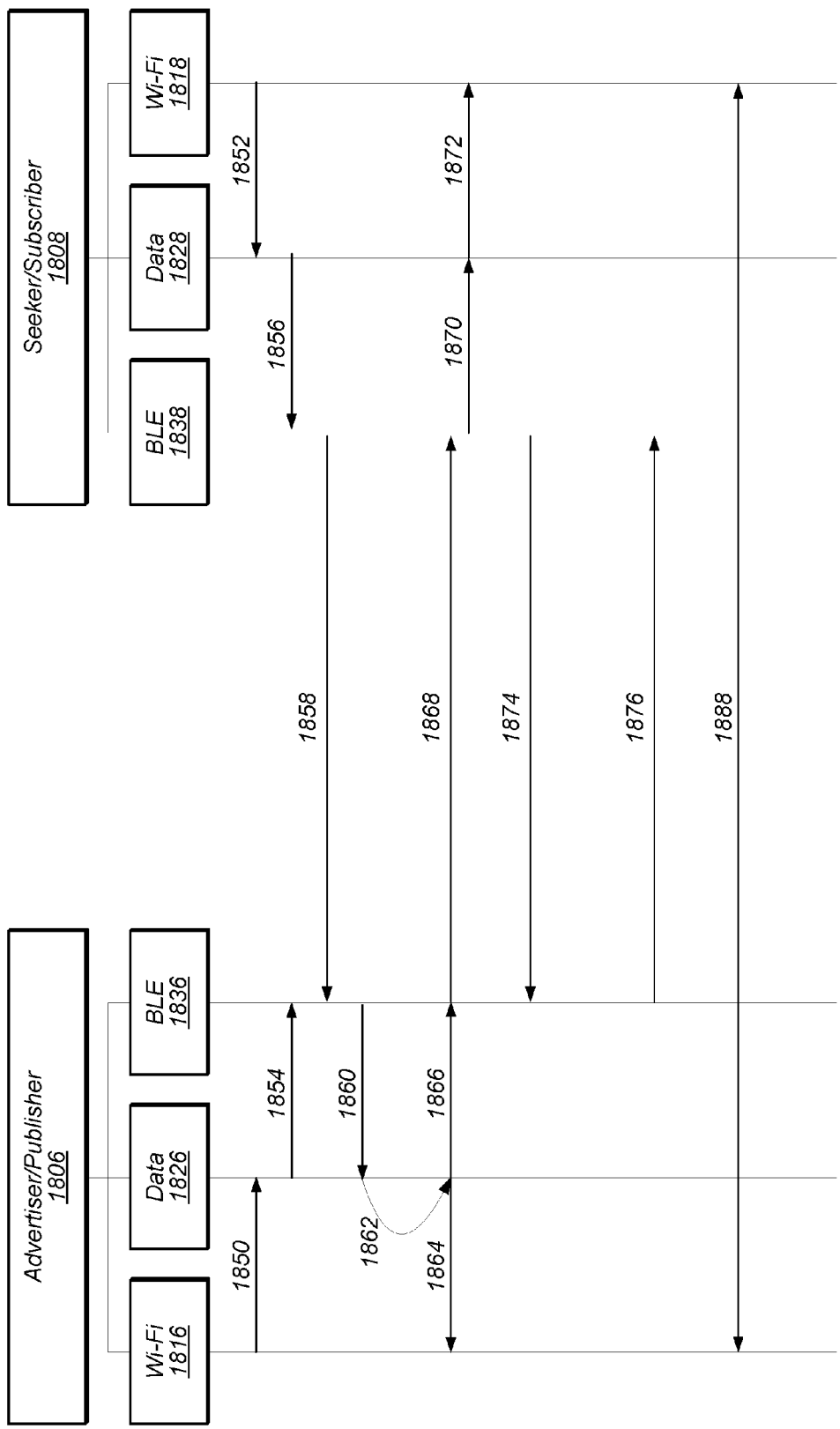
FIG. 18 illustrates an example signaling diagram between a publisher performing passive scanning and a subscriber performing active scanning for a solicited publish of a service, according to some embodiments.

FIG. 18 illustrates a signaling diagram between a publisher performing passive scanning and a subscriber performing active scanning for a solicited publish of a service, according to some embodiments. In other words, an advertiser (e.g., publisher), such as advertiser/publisher 1806, may be advertising services only when solicited (e.g., solicited publish), and a seeker (e.g., subscriber), such as seeker/subscriber 1808, may be actively seeking (or soliciting) services. The publisher (e.g., advertiser/publisher 1806) may be performing a passive scan at a Bluetooth low energy (BLE) layer and the subscriber may be performing an active scan at a BLE layer.

Advertiser/publisher 1806 and seeker/subscriber 1808 may each include features as described above with reference to client station 106. As shown, advertiser/publisher 1806 may include a Wi-Fi layer 1816 for performing Wi-Fi communications, a data access layer 1826 (e.g., an ASP 2.0 layer) for data access, and a BLE layer 1836 for performing Bluetooth (BT) communications. Additionally, as shown, seeker/subscriber 1808 may include a Wi-Fi layer 1818 for performing Wi-Fi communications, a data access layer 1828 for data access, and a BLE layer 1838 for performing Bluetooth (BT) communications.

At 1850, advertiser/publisher 1806 may pass an advertised service from Wi-Fi layer 1816 to data access layer 1826. Further, at 1854, data access layer 1826 may pass the advertised service to BLE layer 1836. In addition, BLE layer 1836 may passively scan for requests for the service.

At 1852, seeker/subscriber 1808 may pass a request to subscribe to a service from Wi-Fi layer 1818 to data access layer 1828. Further, at 1856, data access layer 1828 may pass the request to subscribe to BLE layer 1838. At 1858, in response to receiving the request, BLE layer 1838 may transmit a broadcast or unicast message (such as an ADV_IND message) soliciting the service. The message may include information relating to transport status (e.g., whether Wi-Fi is on or off) and supported (or desired) services, among other information. In some embodiments, the message may be sent multiple times. Further, BLE layer 1838 may actively scan for a response to the message.

At 1860, BLE layer 1836 may receive the message soliciting the service from BLE layer 1836 and may pass (or transmit) the message to data access layer 1826. At 1862, data access layer 1826 may determine a service match and may notify BLE layer 1836 and Wi-Fi layer 1818 of the service match at 1866 and 1864, respectively. In addition, at 1864, data access layer 1826 may send an instruction to Wi-Fi layer 1816 to enable (e.g., turn on) Wi-Fi capabilities. Further, at 1866, data access layer 1826 may send an instruction to BLE 1836 to respond to the subscriber.

At 1868, BLE layer 1836 may send a response message (e.g., an ADV_IND response message) to BLE layer 1838. The response message may include information relating to transport status and supported services, among other information.

At 1870, BLE layer 1838 may pass the response message to data access layer 1828. At 1872, data access layer 1828 may send instructions to Wi-Fi layer 1818 to enable (e.g., turn on) Wi-Fi capabilities.

At 1874, BLE 1838 may send a request message (e.g., a SCAN_REQ) to BLE layer 1836. The request message may request further information regarding the service.

At 1876, BLE layer 1836 may send a response message (e.g., a SCAN_RES response message) to BLE layer 1838. The response message may include information relating to transport status and supported services, among other information.

At 1888, the devices may proceed to Wi-Fi discovery and connection and establishment of a NAN datapath via communications between Wi-Fi layer 1816 and Wi-Fi layer 1818.

Figure 19:
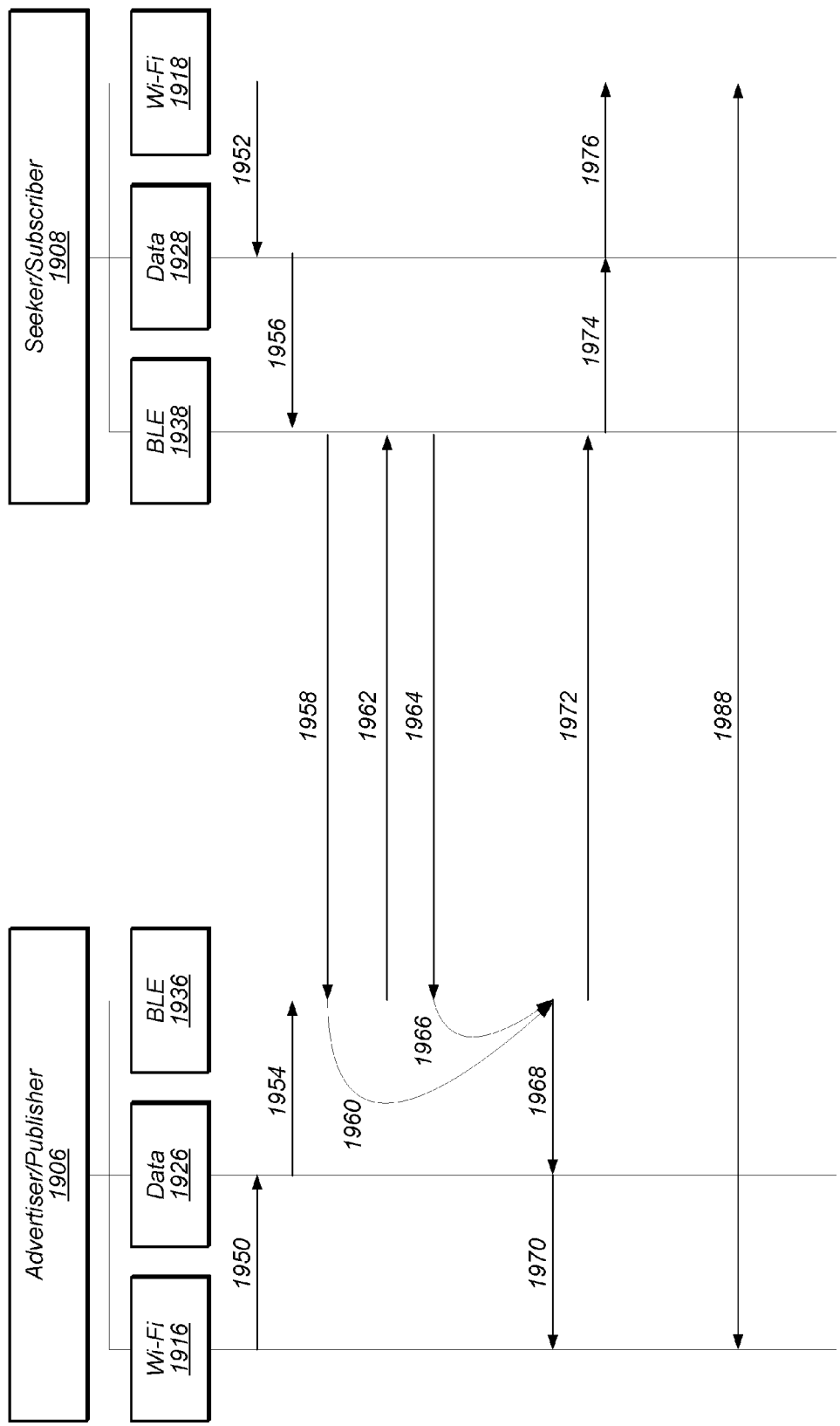
FIG. 19 illustrates an example signaling diagram between a publisher performing active scanning and a subscriber performing passive scanning for a solicited publish of a service, according to some embodiments.

FIG. 19 illustrates a signaling diagram between a publisher performing active scanning and a subscriber performing passive scanning for a solicited publish of a service, according to some embodiments. In other words, an advertiser (e.g., publisher), such as advertiser/publisher 1906, may be advertising services only when solicited (e.g., solicited publish), and a seeker (e.g., subscriber), such as seeker/subscriber 1908, may be actively seeking (or soliciting) services. The publisher (e.g., advertiser/publisher 1906) may be performing an active scan at a Bluetooth low energy (BLE) layer and the subscriber may be performing a passive scan at a BLE layer.

Advertiser/publisher 1906 and seeker/subscriber 1908 may each include features as described above with reference to client station 106. As shown, advertiser/publisher 1906 may include a Wi-Fi layer 1916 for performing Wi-Fi communications, a data access layer 1926 (e.g., an ASP 2.0 layer) for data access, and a BLE layer 1936 for performing Bluetooth (BT) communications. Additionally, as shown, seeker/subscriber 1908 may include a Wi-Fi layer 1918 for performing Wi-Fi communications, a data access layer 1928 for data access, and a BLE layer 1938 for performing Bluetooth (BT) communications.

At 1950, advertiser/publisher 1906 may pass an advertised service from Wi-Fi layer 1916 to data access layer 1926. Further, at 1954, data access layer 1926 may pass the advertised service to BLE layer 1936. In addition, BLE layer 1936 may actively scan for requests for the service.

At 1952, seeker/subscriber 1908 may pass a request to subscribe to a service from Wi-Fi layer 1918 to data access layer 1928. Further, at 1956, data access layer 1928 may pass the request to subscribe to BLE layer 1938. At 1958, in response to receiving the request, BLE layer 1938 may transmit a broadcast or unicast message (such as an ADV_IND message) soliciting the service. The message may include information relating to transport status (e.g., whether Wi-Fi is on or off) and supported (or desired) services, among other information. In some embodiments, the message may be sent multiple times. Further, BLE layer 1938 may actively scan for a response to the message.

At 1960, BLE layer 1936 may receive the message soliciting the service from BLE layer 1936 and may determine a service match.

At 1962, BLE 1936 may send a request message (e.g., a SCAN_REQ) to BLE layer 1938. The request message may request further information regarding the service.

At 1964, BLE 1938 may send a response message (e.g., a SCAN_RES response message) to BLE layer 1938. The response message may include information relating to transport status and supported services, among other information.

At 1966, BLE may determine a device match (note a service match was determined at 1960) and, at 1968, BLE layer 1936 may send the service information (device and service match) to data access layer 1926. Further, at 1970, data access layer 1926 may send instructions to Wi-Fi layer 1916 to enable Wi-Fi capabilities for advertiser/publisher 1906.

At 1972, BLE 1936 may send an updated response message (e.g., an ADV_IND response message) to BLE layer 1938. The response message may include information relating to transport status and supported services, among other information.

At 1974, BLE 1938 may send the updated response message to data access layer 1928, and, at 1976, data access layer (based at least in part on the updated response message) may send instructions to Wi-Fi layer 1918 to enable Wi-Fi capabilities for seeker/subscriber 1908.

At 1988, the devices may proceed to Wi-Fi discovery and connection and establishment of a NAN datapath via communications between Wi-Fi layer 1916 and Wi-Fi layer 1918.

Figure 20:
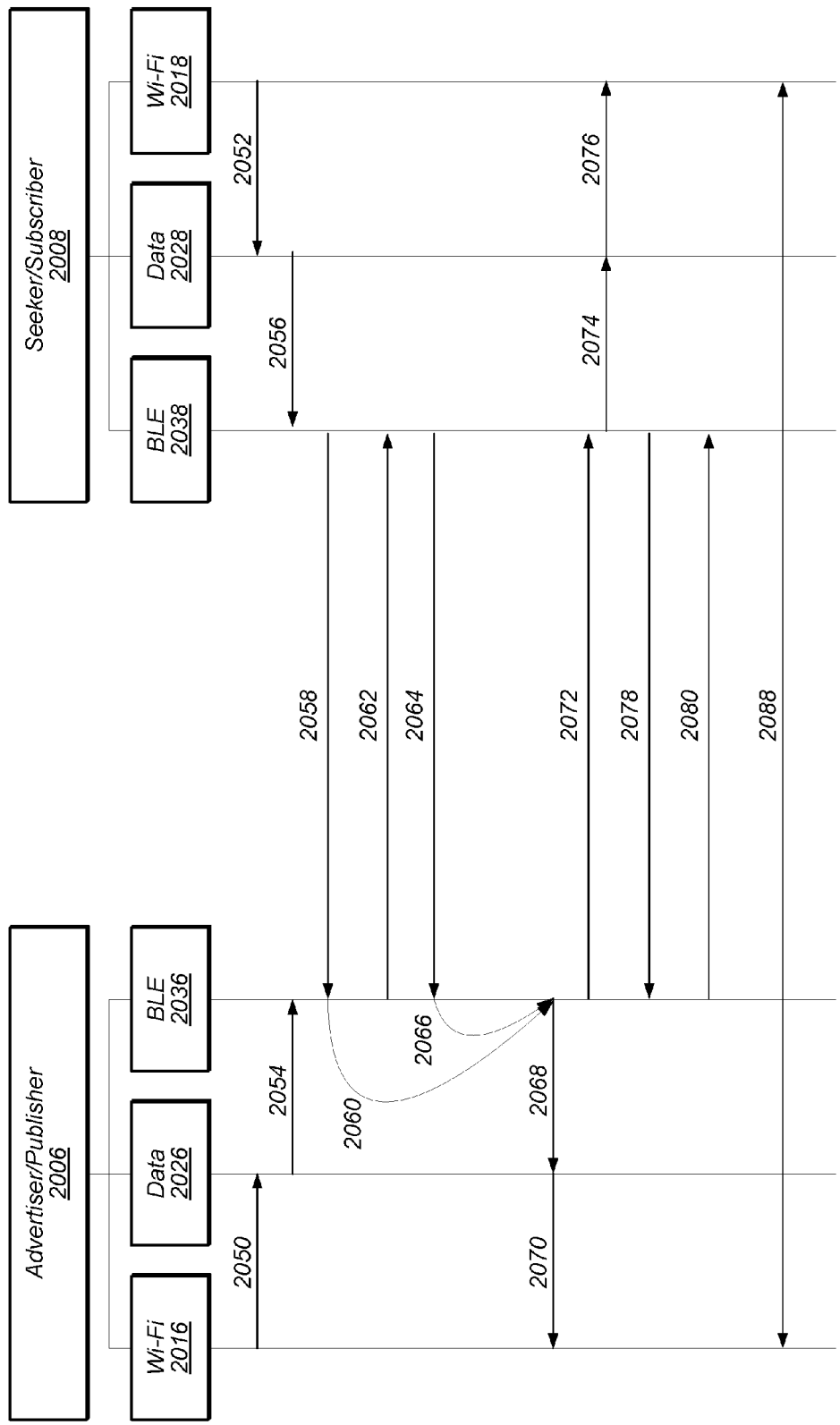
FIG. 20 illustrates an example signaling diagram between a publisher performing active scanning and a subscriber performing active scanning for a solicited publish of a service, according to some embodiments.

FIG. 20 illustrates a signaling diagram between a publisher performing active scanning and a subscriber performing active scanning for a solicited publish of a service, according to some embodiments. In other words, an advertiser (e.g., publisher), such as advertiser/publisher 2006, may be advertising services only when solicited (e.g., solicited publish), and a seeker (e.g., subscriber), such as seeker/subscriber 2008, may be actively seeking (or soliciting) services. The publisher (e.g., advertiser/publisher 2006) may be performing an active scan at a Bluetooth low energy (BLE) layer and the subscriber may be performing a passive scan at a BLE layer.

Advertiser/publisher 2006 and seeker/subscriber 2008 may each include features as described above with reference to client station 106. As shown, advertiser/publisher 2006 may include a Wi-Fi layer 2016 for performing Wi-Fi communications, a data access layer 2026 (e.g., an ASP 2.0 layer) for data access, and a BLE layer 2036 for performing Bluetooth (BT) communications. Additionally, as shown, seeker/subscriber 2008 may include a Wi-Fi layer 2018 for performing Wi-Fi communications, a data access layer 2028 for data access, and a BLE layer 2038 for performing Bluetooth (BT) communications.

At 2050, advertiser/publisher 2006 may pass an advertised service from Wi-Fi layer 2016 to data access layer 2026. Further, at 2054, data access layer 2026 may pass the advertised service to BLE layer 2036. In addition, BLE layer 2036 may actively scan for requests for the service.

At 2052, seeker/subscriber 2008 may pass a request to subscribe to a service from Wi-Fi layer 2018 to data access layer 2028. Further, at 2056, data access layer 2028 may pass the request to subscribe to BLE layer 2038. At 2058, in response to receiving the request, BLE layer 2038 may transmit a broadcast or unicast message (such as an ADV_IND message) soliciting the service. The message may include information relating to transport status (e.g., whether Wi-Fi is on or off) and supported (or desired) services, among other information. In some embodiments, the message may be sent multiple times. Further, BLE layer 2038 may actively scan for a response to the message.

At 2060, BLE layer 2036 may receive the message soliciting the service from BLE layer 2036 and may determine a service match.

At 2062, BLE 2036 may send a request message (e.g., a SCAN_REQ) to BLE layer 2038. The request message may request further information regarding the service.

At 2064, BLE 2038 may send a response message (e.g., a SCAN_RES response message) to BLE layer 2036. The response message may include information relating to transport status and supported services, among other information.

At 2066, BLE may determine a device match (note a service match was determined at 2060) and, at 2068, BLE layer 2036 may send the service information (device and service match) to data access layer 2026. Further, at 2070, data access layer 2026 may send instructions to Wi-Fi layer 2016 to enable Wi-Fi capabilities for advertiser/publisher 2006.

At 2072, BLE 2036 may send an updated response message (e.g., an ADV_IND response message) to BLE layer 2038. The response message may include information relating to transport status and supported services, among other information.

At 2074, BLE 2038 may send the updated response message to data access layer 2028, and, at 2076, data access layer (based at least in part on the updated response message) may send instructions to Wi-Fi layer 2018 to enable Wi-Fi capabilities for seeker/subscriber 2008.

At 2078, BLE 2038 may send a request message (e.g., a SCAN_REQ) to BLE layer 2036. The request message may request further information regarding the service.

At 2080, BLE 2036 may send a response message (e.g., a SCAN_RES response message) to BLE layer 2038. The response message may include information relating to transport status and supported services, among other information.

At 2088, the devices may proceed to Wi-Fi discovery and connection and establishment of a NAN datapath via communications between Wi-Fi layer 2016 and Wi-Fi layer 2018.

Post BLE Trigger: NAN Further Discovery

Figure 21:
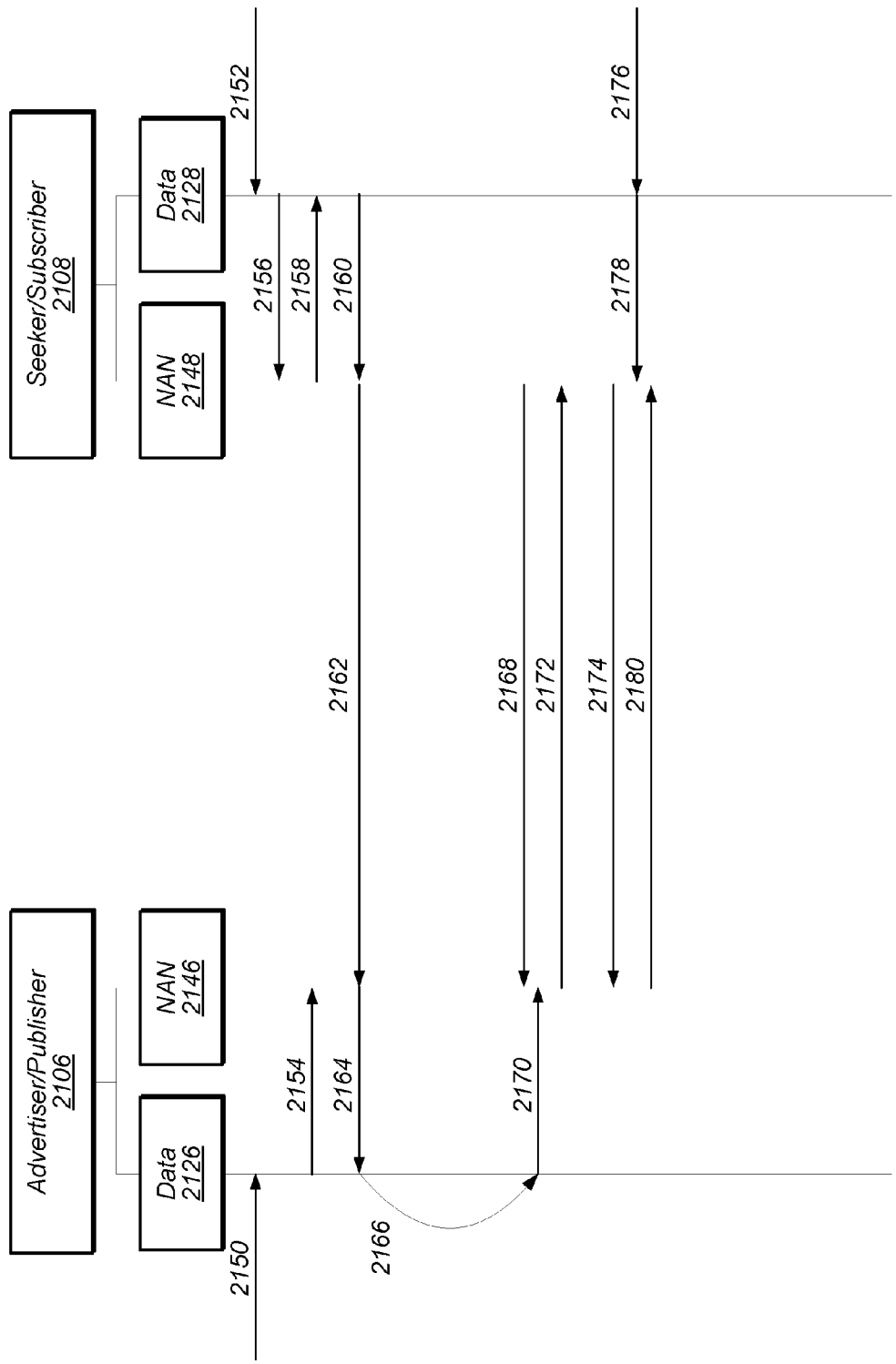
FIG. 21 illustrates an example signaling diagram between a publisher and a subscriber for establishing a NAN datapath post BLE layer discovery, including establishing a new NAN cluster, according to some embodiments.
Figure 22:
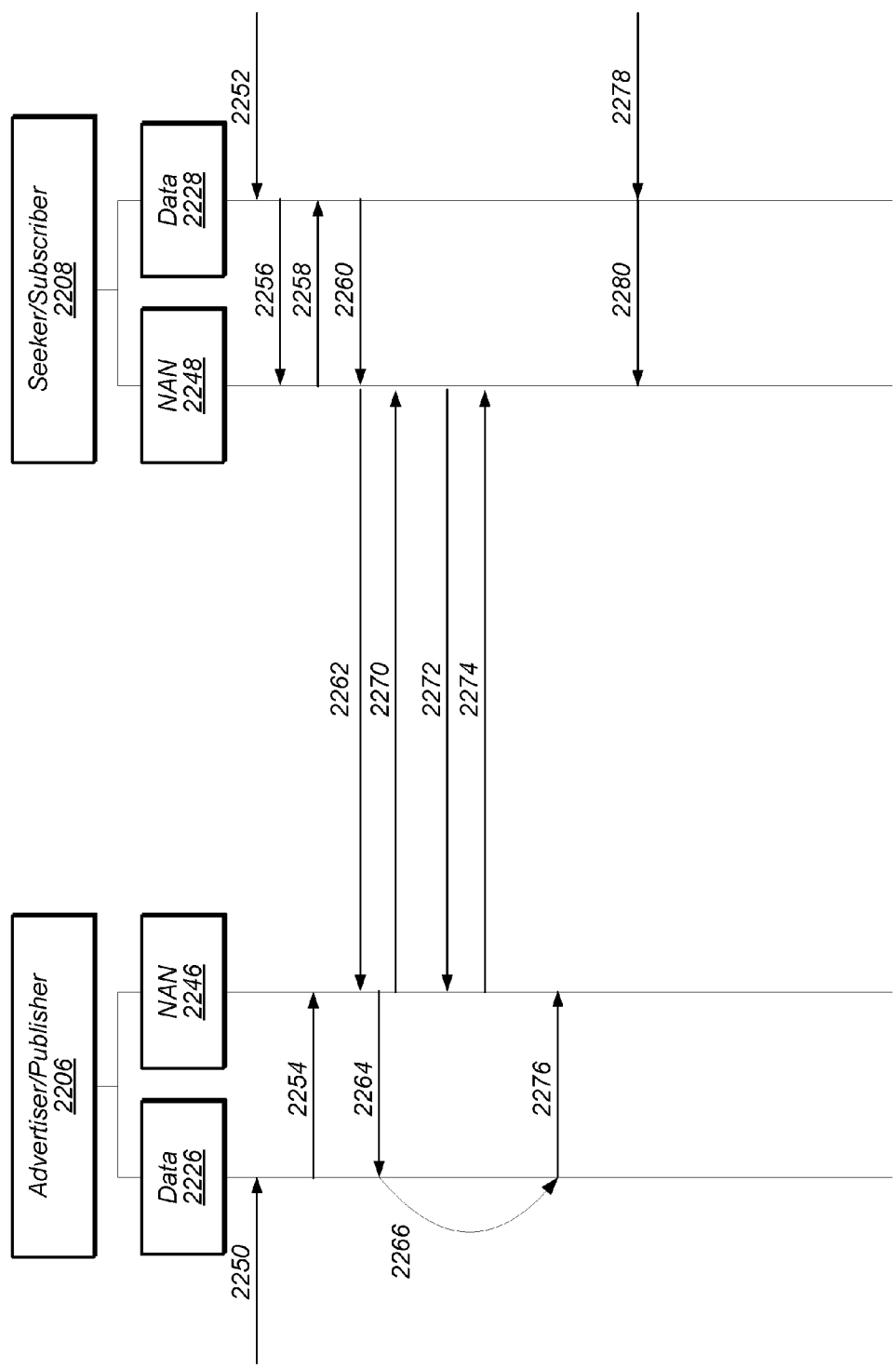
FIG. 22 illustrates an example signaling diagram between a publisher and a subscriber for establishing a NAN datapath post BLE layer discovery, including joining an existing NAN cluster, according to some embodiments.
Figure 23:
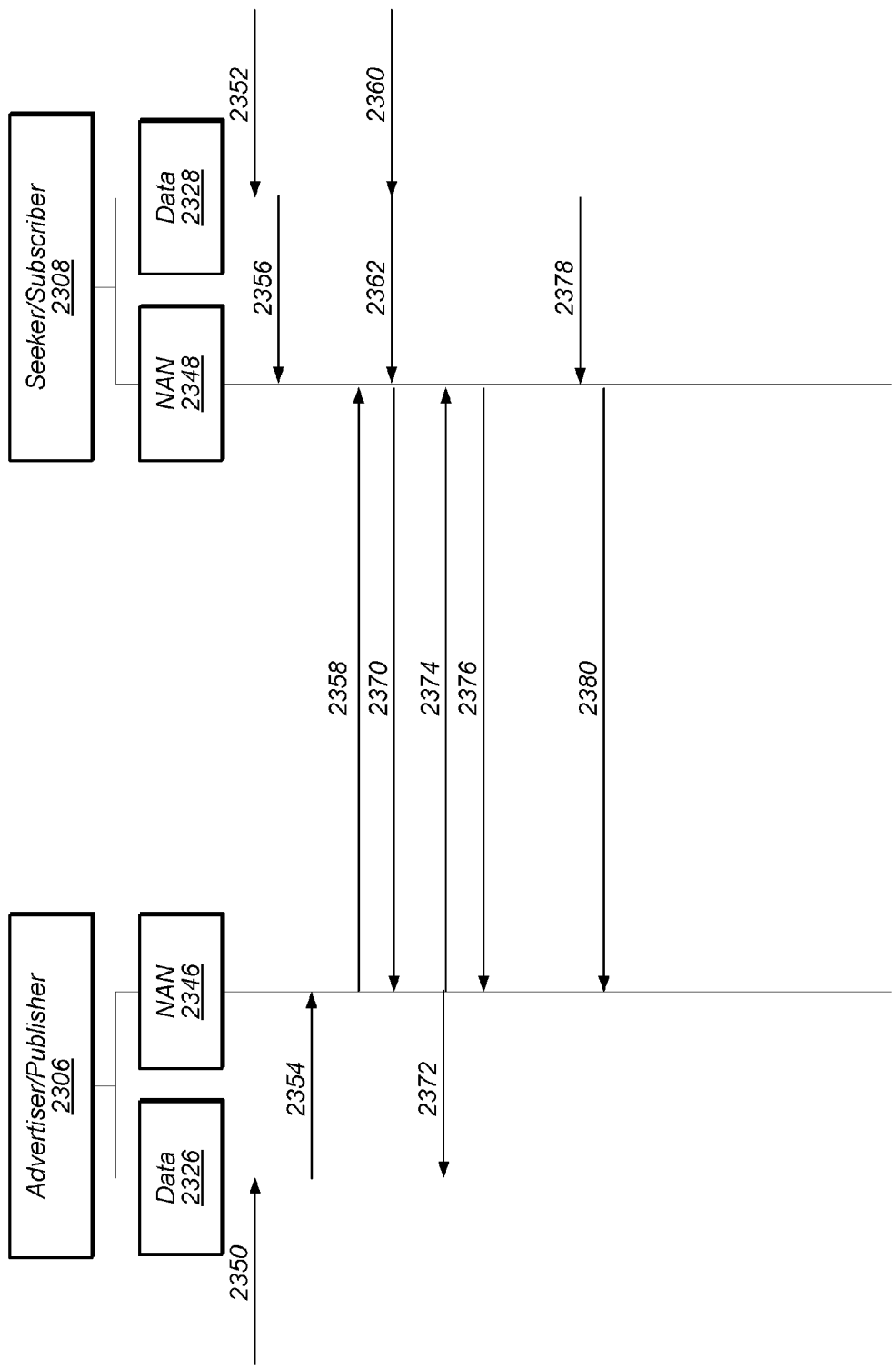
FIG. 23 illustrates an example signaling diagram between a publisher and a subscriber for establishing a NAN datapath post BLE layer discovery, according to some embodiments.

As described herein, NAN devices may use BLE layer signaling to establish a Wi-Fi connection to allow establishment of a NAN datapath. FIGS. 21-23 illustrate various embodiments of establishing a NAN datapath post BLE layer signaling (i.e., BLE discovery). The signaling shown in FIGS. 21-23 may be used in conjunction with any of the systems or devices shown in the above Figures, among other devices. In various embodiments, some of the signaling shown may be performed concurrently, in a different order than shown, or may be omitted. Additional signaling may also be performed as desired. According to some embodiments, BLE discovery may provide a publisher (e.g., an advertiser) with a NAN interface address of a subscriber. The subscriber may first perform scanning for existing clusters and if no cluster is found, the subscriber may create a new cluster. The subscriber may then resume a role as a master device and may start sending NAN discovery beacon frames. After the advertiser turns ON its NAN interface, it may start scanning for the NAN discovery beacon frame/NAN sync beacon frame and may synchronize its clock to the subscriber. Then, in a next discover window (DW), service discovery frames may be exchanged between the publisher and subscriber and a datapath may be established.

FIG. 21 illustrates a signaling diagram between a publisher and a subscriber for establishing a NAN datapath post BLE layer discovery, including establishing a new NAN cluster, according to some embodiments. Advertiser/publisher 2106 and seeker/subscriber 2108 may each include features as described above with reference to client station 106. As shown, advertiser/publisher 2106 may include a NAN layer 2146 for performing peer-to-peer communications via Wi-Fi and a data access layer 2126 (e.g., an ASP 2.0 layer) for data access. Additionally, as shown, seeker/subscriber 2108 may include a NAN layer 2148 for performing peer-to-peer communications via Wi-Fi and a data access layer 2128 for data access.

At 2150, data access layer 2126 may receive a NAN interface address of seeker/subscriber 2108 via BLE layer discovery as described above in reference to FIGS. 10-20. At 2154, data access layer 2126 may send an instruction(s) to NAN layer 2146 to enable a NAN interface. NAN layer 2146 may then scan for NAN discovery beacons and/or NAN synchronization beacons.

At 2152, data access layer 2128 may receive a notification to enable (or turn on) a NAN interface and at 2156, may notify (e.g., may send an instruction(s) to) NAN layer 2148 to enable the NAN interface.

At 2158, NAN layer 2148 may scan for existing NAN clusters. In some embodiments, if no NAN clusters are found, NAN layer 2148 may send a notification to data access layer 2128 and, in response, NAN layer 2148 may receive instructions from data access 2128 to establish a new NAN cluster at 2160.

At 2162, NAN layer 2148 may assume the role of cluster master and may broadcast NAN discovery beacons. The NAN discovery beacons may include the NAN interface address of seeker/subscriber 2108.

At 2164, NAN layer 2146 may receive a NAN discovery beacon and forward the NAN interface address included in the NAN discovery beacons to data access layer 2126. At 2166, data access layer 2126 may determine that the NAN interface address included in the NAN discovery beacons at 2162 match the NAN interface address provided at 2150.

At 2170, data access layer 2126 may send information regarding the address match to NAN layer 2146. In addition, at 2168, NAN layer 2148 may broadcast a NAN synchronization beacon. Thus, NAN layer 2146 may synchronize with NAN layer 2148 and NAN layers 2146 and 2148 may exchange service discovery frames (SDFs) at 2172, and 2174. The SDF sent by NAN layer 2146 at 2172 may include a service descriptor and the SDF sent by NAN layer 2148 at 2174 may include session information.

At 2176, data access layer 2128 may receive a session connect request from an application and may forward the session connect request to NAN layer 2148 at 2178. Finally, at 2180, NAN layer 2146 may send an SDF that includes a session confirmation to NAN layer 2148 to finalize NAN datapath setup.

FIG. 22 illustrates a signaling diagram between a publisher and a subscriber for establishing a NAN datapath post BLE layer discovery, including joining an existing NAN cluster, according to some embodiments. Advertiser/publisher 2206 and seeker/subscriber 2208 may each include features as described above with reference to client station 106. As shown, advertiser/publisher 2206 may include a NAN layer 2246 for performing peer-to-peer communications via Wi-Fi and a data access layer 2226 (e.g., an ASP 2.0 layer) for data access. Additionally, as shown, seeker/subscriber 2208 may include a NAN layer 2248 for performing peer-to-peer communications via Wi-Fi and a data access layer 2228 for data access.

At 2250, data access layer 2226 may receive a NAN interface address of seeker/subscriber 2208 via BLE layer discovery as described above in reference to FIGS. 10-20. At 2254, data access layer 2226 may send an instruction(s) to NAN layer 2246 to enable a NAN interface. NAN layer 2246 may then scan for NAN discovery beacons and/or NAN synchronization beacons.

At 2252, data access layer 2228 may receive a notification to enable (or turn on) a NAN interface and at 2256, may notify (e.g., may send an instruction(s) to) NAN layer 2248 to enable the NAN interface.

At 2258, NAN layer 2248 may scan for existing NAN clusters. In some embodiments, if a NAN cluster is found, NAN layer 2248 may send a notification to data access layer 2228 and, in response, NAN layer 2248 may receive instructions from data access 2228 to join the found NAN cluster at 2260.

At 2262, NAN layer 2248 may assume the role of cluster master or non-master synch and may broadcast NAN synchronization beacons. The NAN synchronization beacons may include the NAN interface address of seeker/subscriber 2208.

At 2264, NAN layer 2246 may receive a NAN synchronization beacon and forward the NAN interface address included in the NAN synchronization beacon to data access layer 2226. At 2266, data access layer 2226 may determine that the NAN interface address included in the NAN synchronization beacon at 2262 match the NAN interface address provided at 2250. In addition, In addition, NAN layer 2246 may synchronize with NAN layer 2248 based on the NAN synchronization beacon received at 2262 and NAN layers 2246 and 2248 may exchange service discovery frames (SDFs) at 2270 and 2272. The SDF sent by NAN layer 2246 at 2270 may include a service descriptor and the SDF sent by NAN layer 2248 at 2272 may include session information. Further, at 2274, NAN layer 2246 may send an SDF that includes a session confirmation to NAN layer 2248 to finalize NAN datapath setup.

At 2276, data access layer 2226 may send instructions indicating that the NAN addresses received at 2250 and 2262 match. In addition, the instructions may indicate NAN layer 2246 to join the existing cluster found by NAN layer 2248. In addition, at 2278, data access layer 2228 may receive a session connect request from an application and may forward the session connect request to NAN layer 2248 at 2280.

FIG. 23 illustrates a signaling diagram between a publisher and a subscriber for establishing a NAN datapath post BLE layer discovery, according to some embodiments. Advertiser/publisher 2306 and seeker/subscriber 2308 may each include features as described above with reference to client station 106. As shown, advertiser/publisher 2306 may include a NAN layer 2346 for performing peer-to-peer communications via Wi-Fi and a data access layer 2326 (e.g., an ASP 2.0 layer) for data access. Additionally, as shown, seeker/subscriber 2308 may include a NAN layer 2348 for performing peer-to-peer communications via Wi-Fi and a data access layer 2328 for data access.

At 2350, data access layer 2326 may receive a NAN interface address of seeker/subscriber 2308 and a channel number in which seeker/subscriber 2308 will be on and monitoring (e.g., scanning) via BLE layer discovery as described above in reference to FIGS. 10-20. At 2354, data access layer 2326 may send an instruction(s) to NAN layer 2346 to enable a NAN interface.

At 2352, data access layer 2328 may receive a notification to enable (or turn on) a NAN interface and at 2356, may notify (e.g., may send an instruction(s) to) NAN layer 2348 to enable the NAN interface and begin scanning for messages from advertiser/publisher 2306.

At 2358, NAN layer 2346 may send a unicast SDF to NAN layer 2348. The unicast SDF may include a service descriptor. In addition, at 2360, data access layer 2328 may receive a session connect request from an application and may forward the session connect request to NAN layer 2348 at 2362.

At 2376, NAN layer 2348 may send a discovery beacon to NAN layer 2346. In addition, NAN layer 2348 may scan for existing clusters, and at 2378, NAN layer 2348 may create a new cluster and assume a role of master. Finally, at 2380, NAN layer 2348 may send a NAN synchronization beacon to NAN layer 2346. Thus, NAN layer 2346 may synchronize with NAN layer 2348 and the NAN datapath setup may be finalized.

Further Embodiments

Figure 24A:
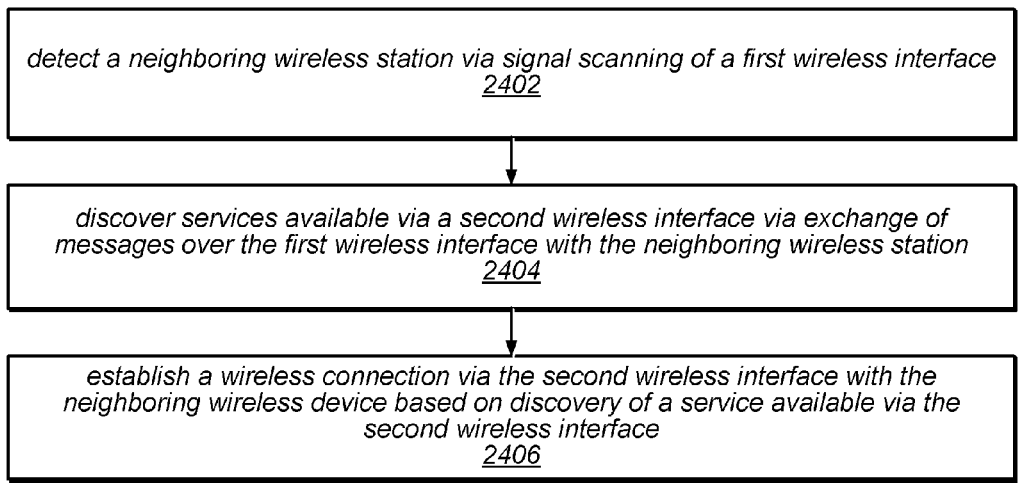
FIG. 24A illustrates an example block diagram of a method for discovery of services provided via a first wireless interface using a second wireless interface, according to some embodiments.

FIG. 24A illustrates a block diagram of a method for discovery of services provided via a first wireless interface using a second wireless interface, according to some embodiments. The method shown in FIG. 24A may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 2402, a neighboring wireless station may be detected via signal scanning of a first wireless interface. In some embodiments, the first wireless interface may be a Bluetooth (BT), Bluetooth low energy (BLE), ZigBee, or another low power wireless interface. In some embodiments, the signal scanning may detect (and receive) and advertisement of a service (e.g., an ADV_IND message as described above) sent from the neighboring wireless device. In some embodiments, further information regarding the advertisement may be requested via the first wireless interface, however, in other embodiments, no further information regarding the advertisement may be requested.

At 2404, services available via a second wireless interface may be discovered via an exchange of messages with the neighboring wireless station via the first wireless interface. In some embodiments, the messages may include a reverse advertisement (e.g., an ADV_IND message described above) and/or connection request and response messages (e.g., CONNECT_REQ and CONNECT_RES messages as described above). In some embodiments, the second wireless interface may be a Wi-Fi interface. In some embodiments, GATT database queries may be performed to exchange further service information as part of the service discovery.

At 2406, a wireless connection may be established with the neighboring wireless station via the second wireless interface. Establishment of the connection may be based, at least in part, on a discovery of a service available via the second wireless interface. The connection may be based on the NAN protocol, in some embodiments.

In some embodiments, a datapath (e.g., a NAN datapath) may be established with the neighboring wireless station via the wireless connection (e.g., via the second wireless interface). In some embodiments, service discovery frames (SDFs) may be exchanged between the wireless stations to establish the datapath as described above in reference to FIGS. 21-23.

Figure 24B:
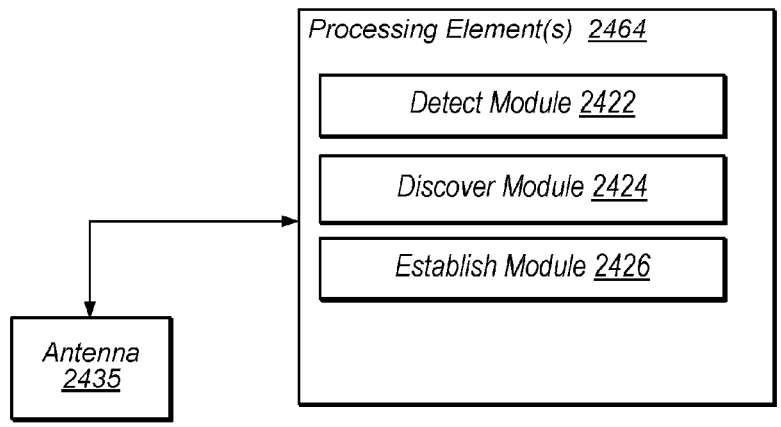
FIG. 24B illustrates an example of a processing element including modules for discovery of services provided via a first wireless interface using a second wireless interface, according to some embodiments.

FIG. 24B illustrates an example of a processing element including modules for discovery of services provided via a first wireless interface using a second wireless interface, according to some embodiments. In some embodiments, antenna 2435 may be coupled (directly or indirectly) to processing element 2464. The processing element may be configured to perform the method described above in reference to FIG. 24A. In some embodiments, processing element 2435 may include one or more modules, such as modules (or circuitry) 2422-2426, and the modules (or circuitry) may be configured to perform various operations of the method described above in reference to FIG. 24A. In some embodiments, the processing element may be included in a client station such as client station 106. As shown, the modules may be configured as follows.

In some embodiments, processing element 2464 may include a detect module 2422 configured to detect a neighboring wireless station via signal scanning of a first wireless interface. In some embodiments, the first wireless interface may be a Bluetooth (BT), Bluetooth low energy (BLE), ZigBee, or another low power wireless interface. In some embodiments, the signal scanning may detect (and receive) and advertisement of a service (e.g., an ADV_IND message as described above) sent from the neighboring wireless device. In some embodiments, further information regarding the advertisement may be requested via the first wireless interface, however, in other embodiments, no further information regarding the advertisement may be requested.

In some embodiments, processing element 2464 may include a discover module 2424 configured to discover services available via a second wireless interface via an exchange of messages with the neighboring wireless station via the first wireless interface. In some embodiments, the messages may include a reverse advertisement (e.g., an ADV_IND message described above) and/or connection request and response messages (e.g., CONNECT_REQ and CONNECT_RES messages as described above). In some embodiments, the second wireless interface may be a Wi-Fi interface. In some embodiments, GATT database queries may be performed to exchange further service information as part of the service discovery.

In some embodiments, processing element 2464 may include an establish module 2426 configured to establish a wireless connection with the neighboring wireless station via the second wireless interface. Establishment of the connection may be based, at least in part, on a discovery of a service available via the second wireless interface. The connection may be based on the NAN protocol, in some embodiments.

In some embodiments, the processing element may include a module configured to establish a datapath (e.g., a NAN datapath) with the neighboring wireless station via the wireless connection (e.g., via the second wireless interface). In some embodiments, service discovery frames (SDFs) may be exchanged between the wireless stations to establish the datapath as described above in reference to FIGS. 21-23.

It is apparent for those skilled in the art that, for the particular processes of the modules (or circuitry) described above (such as modules 2422, 2424, and 2426 reference may be made to the corresponding operations (such as operations 2402, 2404, and 2406, respectively) in the related process embodiment sharing the same concept and the reference is regarded as the disclosure of the related modules (or circuitry) as well. Furthermore, processing element 2464 may be implemented in software, hardware or combination thereof. More specifically, processing element 2464 may be implemented as circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors. Additionally, processing element 2464 may be implemented as a general-purpose processor such as a CPU, and therefore each module can be implemented with the CPU executing instructions stored in a memory which perform a respective operation.

Figure 25A:
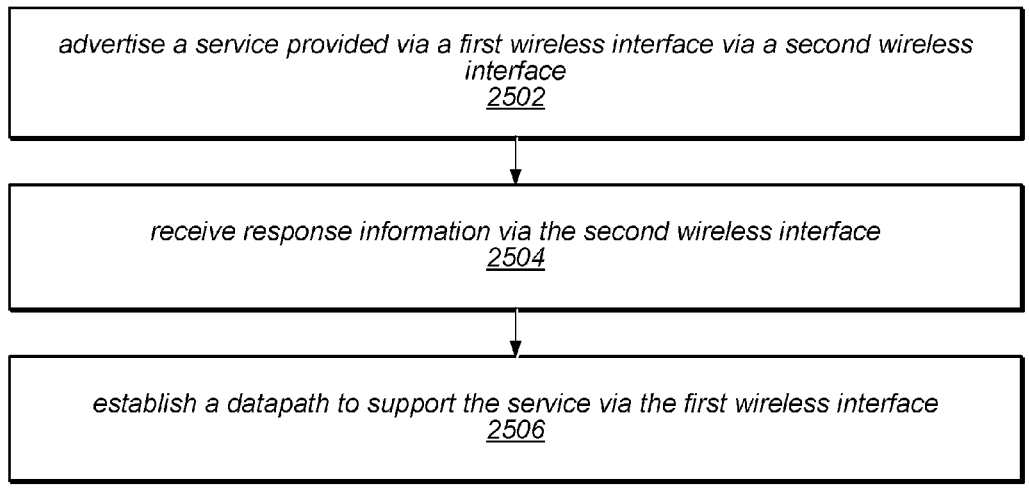
FIG. 25A illustrates a block diagram of another example method for discovery of services provided via a first wireless interface using a second wireless interface, according to some embodiments.

FIG. 25A illustrates a block diagram of another method for discovery of services provided via a first wireless interface using a second wireless interface, according to some embodiments. The method shown in FIG. 25A may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 2502, a service available via a first wireless interface may be advertised over a second wireless interface. The first wireless interface may be a higher power interface than the second wireless interface. In some embodiments, the first wireless interface may be a Wi-Fi interface and the second wireless interface may be a Bluetooth (BT), Bluetooth low energy (BLE), or ZigBee interface. In some embodiments, the advertisement may be an ADV_IND message as described above or a message containing advertisement information, such as service descriptors and transport status.

At 2504, response information may be received via the second wireless interface. The response information may be a reverse advertisement as described above. In some embodiments, the response information may indicate a subscription to a service from a neighboring wireless station. In some embodiments, the response information may include transport status of a wireless interface of the neighboring wireless device. In other words, the response information may indicate whether a wireless interface of the neighboring wireless device is enabled or disabled.

At 2506, a datapath may be established to support the service via the first wireless interface. In some embodiments, establishing the datapath may include enabling the first wireless interface.

Figure 25B:
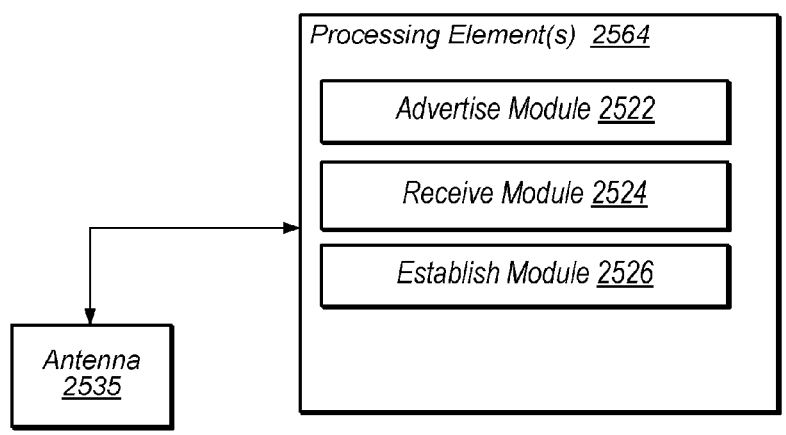
FIG. 25B illustrates an example of a processing element including modules for discovery of services provided via a first wireless interface using a second wireless interface, according to some embodiments.

FIG. 25B illustrates an example of a processing element including modules for discovery of services provided via a first wireless interface using a second wireless interface, according to some embodiments. In some embodiments, antenna 2535 may be coupled (directly or indirectly) to processing element 2564. The processing element may be configured to perform the method described above in reference to FIG. 25A. In some embodiments, processing element 2535 may include one or more modules, such as modules (or circuitry) 2522-2526, and the modules (or circuitry) may be configured to perform various operations of the method described above in reference to FIG. 25A. In some embodiments, the processing element may be included in a client station, such as client station 106. As shown, the modules may be configured as follows.

In some embodiments, processing element 2564 may include an advertise module 2522 configured to advertise a service available via a first wireless interface over a second wireless interface. The first wireless interface may be a higher power interface than the second wireless interface. In some embodiments, the first wireless interface may be a Wi-Fi interface and the second wireless interface may be a Bluetooth (BT), Bluetooth low energy (BLE), or ZibBee interface. In some embodiments, the advertisement may be an ADV_IND message as described above or a message containing advertisement information, such as service descriptors and transport status.

In some embodiments, processing element 2564 may include a receive module 2524 configured to receive response information via the second wireless interface. The response information may be a reverse advertisement as described above. In some embodiments, the response information may indicate a subscription to a service from a neighboring wireless station. In some embodiments, the response information may include transport status of a wireless interface of the neighboring wireless device. In other words, the response information may indicate whether a wireless interface of the neighboring wireless device is enabled or disabled.

In some embodiments, processing element 2564 may include an establish module 2526 configured to established to support the service via the first wireless interface. In some embodiments, establishing the datapath may include enabling the first wireless interface.

It is apparent for those skilled in the art that, for the particular processes of the modules (or circuitry) described above (such as modules 2522, 2524, and 2526) reference may be made to the corresponding operations (such as operations 2502, 2504, and 2506, respectively) in the related process embodiment sharing the same concept and the reference is regarded as the disclosure of the related modules (or circuitry) as well. Furthermore, processing element 2564 may be implemented in software, hardware or combination thereof. More specifically, processing element 2564 may be implemented as circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors. Additionally, processing element 2564 may be implemented as a general-purpose processor such as a CPU, and therefore each module can be implemented with the CPU executing instructions stored in a memory which perform a respective operation.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:
1. A wireless station, comprising:
at least one antenna;
a first wireless interface and a second wireless interface, each configured to perform wireless communications; and at least one processor communicatively coupled to one or more radios, wherein the one or more radios are associated with the first and second wireless interfaces;
wherein the at least one processor is configured to cause the wireless station to:
  detect a first neighboring wireless station via signal scanning using the first wireless interface;
  discover one or more services available via the second wireless interface via exchange of messages over the first wireless interface with the first neighboring wireless station; and
  establish a wireless connection via the second wireless interface with the first neighboring wireless station, based, at least in part, on an identification of a desired service among the one or more discovered services, wherein to establish the wireless connection, the at least one processor is further configured to:
    scan for existing device clusters via the second wireless interface;
    create, in response to not discovering existing device clusters, a new device cluster; and
    broadcast discovery beacon frames via the second wireless interface.

2. The wireless station of claim 1,
wherein, to establish the wireless connection, the at least one processor is further configured to cause the wireless station to:
  establish a datapath with the first neighboring wireless station via the wireless connection.

3. The wireless station of claim 2,
wherein, to establish the datapath, the at least one processor is further configured to cause the wireless station to:
  exchange service discovery frames with the first neighboring wireless station via the second wireless interface.

4. The wireless station of claim 1,
wherein to detect the first neighboring wireless station, the at least one processor is further configured to cause the wireless station to:
  receive advertisement packets comprising an advertisement without requesting additional information regarding the advertisement.

5. The wireless station of claim 1,
wherein to detect the first neighboring wireless station, the at least one processor is further configured to cause the wireless station to:
  receive advertisement packets comprising an advertisement; and
  request additional information regarding the advertisement via the first wireless interface.

6. The wireless station of claim 1,
wherein the messages comprise one or more of:
  a service identifier;
  advertisement information; or
  a status of the first wireless interface.

7. The wireless station of claim 1,
wherein to discover services, the at least one processor is further configured to cause the wireless station to:
perform one or more generic attribute profile (GATT) database queries to exchange further service information.

8. An apparatus, comprising:
a memory; and
a processing element in communication with the memory, wherein the processing element is configured to:
  receive first instructions to advertise a service, wherein the service is provided via a first wireless interface in communication with the processing element, wherein the instructions indicate advertisement of the service via a second wireless interface in communication with the processing element, and wherein the first wireless interface is a higher power interface than the second wireless interface;
  generate second instructions to advertise the service via the second wireless interface;
  receive response information via the second wireless interface, wherein the response information indicates a subscription to the service from a neighboring wireless station, wherein to receive the response information, the processing element is further configured to:
    receive, via the first wireless interface, at least one discovery beacon frame from the neighboring wireless station; and
    generate instructions to join, based, at least in part, on the at least one discovery beacon, a device cluster initiated by the neighboring wireless station; and
  provide third instructions to establish a datapath to support the service via the first wireless interface.

9. The apparatus of claim 8, wherein:
the first wireless interface comprises a Wi-Fi interface; and
the second wireless interface comprises a Bluetooth low energy interface.

10. The apparatus of claim 8,
wherein the first instructions comprise a transport status of the first wireless interface and at least one supported service.

11. The apparatus of claim 10,
wherein the transport status indicates that the first wireless interface is disabled.

12. The apparatus of claim 8,
wherein the third instructions further comprise instructions to enable the first wireless interface.

13. The apparatus of claim 8,
wherein the response information comprises a transport status of a wireless interface of the neighboring wireless station.

14. A non-transitory computer readable memory medium storing program instructions executable by a processor to:
  generate instructions to detect a first neighboring wireless station via Bluetooth low energy (BLE) signal scanning using a BLE interface in communication with the processor;
  generate instructions to discover a service available via a Wi-Fi interface in communication with the processor via exchange of BLE signal messages with the first neighboring wireless station; and
  generate instructions to establish a Wi-Fi connection with the first neighboring wireless station based at least in part on discovery of the service, wherein to establish the Wi-Fi connection, the program instructions are further executable to:
    generate instructions to scan for existing device clusters via the Wi-Fi interface;
    generate instructions to create, in response to not discovering existing device clusters, a new device cluster; and
    generate instructions to broadcast discovery beacon frames via the Wi-Fi interface.

15. The non-transitory computer readable memory medium of claim 14,
wherein, to establish the Wi-Fi connections, the program instructions are further executable to:
generate instructions to establish a datapath with the first neighboring wireless station via the Wi-Fi connection.

16. The non-transitory computer readable memory medium of claim 15,
wherein, to generate instructions to establish the datapath, the program instructions are further executable to:
generate instructions to exchange service discovery frames with the first neighboring wireless station.

17. The non-transitory computer readable memory medium of claim 14,
wherein to detect the first neighboring wireless station, the program instructions are further executable to:
receive advertisement packets comprising an advertisement without requesting additional information regarding the advertisement.

18. The non-transitory computer readable memory medium of claim 14,
wherein to detect the first neighboring wireless station, the program instructions are further executable to:
receive advertisement packets comprising an advertisement; and
generate instructions to request additional information regarding the advertisement.

19. The non-transitory computer readable memory medium of claim 14,
wherein the BLE signal messages comprise one or more of:
a service identifier;
advertisement information; or
a Wi-Fi interface status.

20. The non-transitory computer readable memory medium of claim 14,
wherein to discover Wi-Fi services, the program instructions are further executable to:
generate instructions to perform one or more generic attribute profile (GATT) database queries to exchange further service information.

\* \* \* \* \*